(12) United States Patent
Kim et al.

(10) Patent No.: US 9,887,419 B2
(45) Date of Patent: Feb. 6, 2018

(54) ACTIVE MATERIAL, METHOD OF PREPARING THE ACTIVE MATERIAL ELECTRODE INCLUDING THE ACTIVE MATERIAL, AND SECONDARY BATTERY INCLUDING THE ELECTRODE

(71) Applicant: Samsung Electronics Co., Ltd., Suwon-si, Gyeonggi-do (KR)

(72) Inventors: Ryounghee Kim, Yongin-si (KR); Seoksoo Lee, Yongin-si (KR); Dongwook Han, Yongin-si (KR); Anass Benayad, Yongin-si (KR); Jusik Kim, Seongnam-si (KR); Wonseok Chang, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 454 days.

(21) Appl. No.: 14/467,284

(22) Filed: Aug. 25, 2014

(65) Prior Publication Data
US 2015/0056515 A1    Feb. 26, 2015

(30) Foreign Application Priority Data

Aug. 26, 2013 (KR) .......... 10-2013-0101294
Jul. 31, 2014 (KR) .......... 10-2014-0098632

(51) Int. Cl.
| | |
|---|---|
| *H01M 4/48* | (2010.01) |
| *H01M 10/054* | (2010.01) |
| *H01M 10/052* | (2010.01) |
| *H01M 4/02* | (2006.01) |

(52) U.S. Cl.
CPC .......... *H01M 4/483* (2013.01); *H01M 10/052* (2013.01); *H01M 10/054* (2013.01); *H01M 2004/021* (2013.01)

(58) Field of Classification Search
None
See application file for complete search history.

(56) References Cited

U.S. PATENT DOCUMENTS

| | | | |
|---|---|---|---|
| 6,316,141 B1 | 11/2001 | Aurbach et al. | |
| 6,653,022 B2 | 11/2003 | Nordlinder et al. | |
| 7,214,446 B1 | 5/2007 | Bi et al. | |
| (Continued) | | | |

FOREIGN PATENT DOCUMENTS

| | | |
|---|---|---|
| CN | 101320806 | 12/2008 |
| KR | 1020130018435 A | 2/2013 |
| (Continued) | | |

OTHER PUBLICATIONS

Cui et al., "A new high-performance cathode material for rechargeable lithium-ion batteries: Polypyrrole/vanadium oxide nanotubes", Electrochimica Acta, vol. 55, 2010, pp. 8870-8875.
(Continued)

*Primary Examiner* — Alix Eggerding
(74) *Attorney, Agent, or Firm* — Cantor Colburn LLP

(57) ABSTRACT

An electrode active material including a vanadium oxide represented by Formula 1, $$VO_x \qquad \text{Formula 1}$$

wherein vanadium in the vanadium oxide has a mixed oxidation state of a plurality of oxidation numbers, and the oxidation numbers include an oxidation number of +3, and wherein, in Formula 1 above, $1.5 < x < 2.5$.

29 Claims, 13 Drawing Sheets

(56) References Cited

U.S. PATENT DOCUMENTS

| | | | |
|---|---|---|---|
| 8,148,455 B2 | 4/2012 | Posudievsky et al. | |
| 8,309,242 B2 | 11/2012 | Wei et al. | |
| 2008/0286194 A1* | 11/2008 | Eriksson | B01J 23/6482 423/594.8 |
| 2009/0269274 A1 | 10/2009 | Shiozaki et al. | |
| 2011/0235240 A1 | 9/2011 | Lu et al. | |
| 2011/0262804 A1 | 10/2011 | Muldoon et al. | |
| 2012/0164537 A1 | 6/2012 | Aoyagi et al. | |
| 2012/0295162 A1* | 11/2012 | Caillon | C01G 23/003 429/221 |
| 2013/0034780 A1 | 2/2013 | Muldoon et al. | |
| 2013/0115521 A1 | 5/2013 | Doe et al. | |
| 2014/0178773 A1 | 6/2014 | Ryu et al. | |
| 2016/0006028 A1* | 1/2016 | Nair | C25B 11/00 429/231.2 |

FOREIGN PATENT DOCUMENTS

| | | | |
|---|---|---|---|
| KR | 1020140008104 A | | 1/2014 |
| KR | 1020140081507 A | | 7/2014 |
| WO | WO 99/04441 | * | 1/1999 |
| WO | 2011150093 A1 | | 12/2011 |
| WO | 2013011568 A1 | | 1/2013 |

OTHER PUBLICATIONS

Korean Office Action for Korean Patent Application No. 10-2014-0098632 dated Sep. 15, 2015.

Li et al., "Leaf-Like V2O5 Nanosheets Fabricated by a Facile Green Approach as High Energy Cathode Material for Lithium-Ion Batteries", Advanced Energy Materials, vol. 3, 2013, pp. 1171-1175.

Jiao et al., "Electrochemical insertion of magnesium in open-ended vanadium oxide nanotubes", Journal of Power Sources, 156, 2006, pp. 673-676.

Jiao et al., "Mg intercalation properties into open-ended vanadium oxide nanotubes," Electrochemistry Communications, 7, 2005, pp. 431-436.

Jiao et al., "Synthesis of Cu0.1-doped vanadium oxide nanotubes and their application as cathode materials for rechargeable magnesium batteries", Electrochemistry Communications, vol. 8, 2006, pp. 1041-1044.

Irais et al., "A Novel Approach to Vanadium Oxide Nanotubes by Oxidation of V4+ species", J. Phys. Chem. C, 112. 2008, pp. 19930-19933.

* cited by examiner

US 9,887,419 B2

ACTIVE MATERIAL, METHOD OF PREPARING THE ACTIVE MATERIAL ELECTRODE INCLUDING THE ACTIVE MATERIAL, AND SECONDARY BATTERY INCLUDING THE ELECTRODE

RELATED APPLICATIONS

This application claims priority to and the benefit of Korean Patent Application No. 10-2013-0101294, filed on Aug. 26, 2013, and Korean Patent Application No. 10-2014-0098632, filed on Jul. 31, 2014, in the Korean Intellectual Property Office, and all the benefits accruing therefrom under 35 U.S.C. § 119, the contents of which are incorporated herein in their entirety by reference.

BACKGROUND

1. Field

The present disclosure relates to electrode active materials, methods of preparing the electrode active materials, electrodes including the electrode active materials, and secondary batteries including the electrodes.

2. Description of the Related Art

Secondary batteries may be classified as a lithium secondary battery, a sodium secondary battery, and a calcium secondary battery, according to the type of metal. Secondary batteries may be rechargeable to enable an accumulation of energy and provide excellent convenience. Accordingly, secondary batteries have been used in various fields.

A secondary battery may have a structure consisting of a conductor as a positive electrode and an electrolytic solution disposed between the positive electrode and a negative electrode, wherein the conductor may retain ions of metal having strong ionization tendency.

Recently, electronic devices such as mobile phones, video cameras, and computers tend to be portable and miniaturized, and accordingly, batteries thereof as the main power supply are also miniaturized. In addition, power that is consumed by such electronic devices has increased to support a wider variety of functions. Therefore, there is an increasing need for an electrode active material for a secondary battery having improved capacity and long lifetime.

SUMMARY

Provided is an electrode active material having improved capacity and improved lifetime characteristics.

Provided is an electrode including the electrode active material.

Provided is a secondary battery employing the electrode and having improved cell performance.

Provided are methods of preparing the electrode active material. Additional aspects will be set forth in part in the description which follows and, in part, will be apparent from the description.

According to an aspect of the present disclosure, an electrode active material includes a vanadium oxide represented by Formula 1, $$VO_x, \quad \text{Formula 1}$$

wherein the vanadium in the vanadium oxide has a mixed oxidation state of a plurality of oxidation numbers, wherein the plurality of oxidation numbers include an oxidation number of +3, and wherein, in Formula 1, $1.5<x<2.5$.

According to another aspect of the present disclosure, disclosed is a method of preparing an electrode active material including a vanadium oxide represented by Formula 1, $$VO_x, \quad \text{Formula 1}$$

wherein vanadium in the vanadium oxide has a mixed oxidation state of a plurality of oxidation numbers, wherein the oxidation numbers include a oxidation number of +3, and wherein, in Formula 1, $1.5<x<2.5$, the method including: contacting a reducing agent, a solvent, and a starting material including vanadium oxide to obtain a mixture; and applying an electromagnetic wave to the mixture to reduce the starting material, to prepare the vanadium oxide represented by Formula 1.

According to another aspect of the present disclosure, disclosed is an electrode including the electrode active material.

According to another aspect of the present disclosure, disclosed is a secondary battery including the electrode.

In an embodiment, there is provided a magnesium secondary battery.

In an embodiment, there is provided a sodium secondary battery.

In an embodiment, there is provided a lithium secondary battery.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
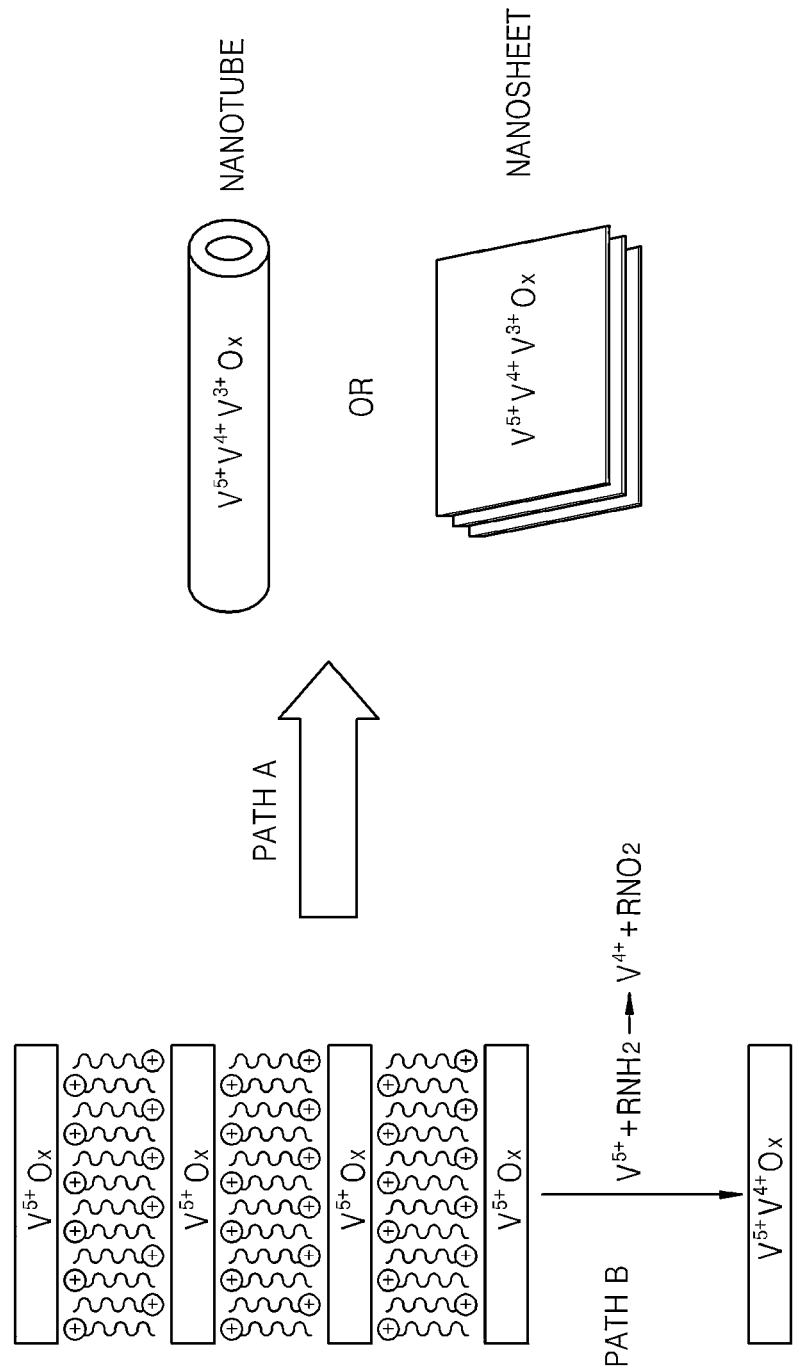
FIG. 1 is a diagram illustrating an embodiment of a method for the formation of a vanadium oxide as an electrode active material for a secondary battery.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described, by referring to the figures, to explain aspects of the present description. As used herein, the term "and/or" includes any and all combinations of one or more of the associated listed items. "Or" means "and/or." Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer or section from another element, component, region, layer, or section. Thus, "a first element," "component," "region," "layer," or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"Alkyl" as used herein means a straight or branched chain, saturated, monovalent hydrocarbon group (e.g., methyl or hexyl).

"Aryl" means a monovalent group formed by the removal of one hydrogen atom from one or more rings of an arene (e.g., phenyl or napthyl).

"Alkylcarbonyl" means an alkyl group bonded through a carbonyl group to provide a group of the formula —C(O)—R, wherein R is alkyl.

"Alkylsulfonyl" means an alkyl group bonded through a sulfonyl group to provide a group of the formula —S(O$_2$)—R, wherein R is alkyl.

"Substituted" means that the compound or group is substituted with at least one (e.g., 1, 2, 3, or 4) substituent independently selected from a hydroxyl (—OH), a C1-9 alkoxy, a C1-9 haloalkoxy, an oxo (=O), a nitro (—NO$_2$), a cyano (—ON), an amino (—NH$_2$), an azido (—N$_3$), an amidino (—C(=NH)NH$_2$), a hydrazino (—NHNH$_2$), a hydrazono (—N—NH₂), a carbonyl (—C(=O)—), a carbamoyl group (—C(O)NH₂), a sulfonyl (—S(=O)₂—), a thiol (—SH), a thiocyano (—SCN), a tosyl (CH₃C₆H₄SO₂—), a carboxylic acid (—C(=O)OH), a carboxylic C1 to C6 alkyl ester (—C(=O)OR wherein R is a C1 to C6 alkyl group), a carboxylic acid salt (—C(=O)OM) wherein M is an organic or inorganic anion, a sulfonic acid (—SO₃H₂), a sulfonic mono- or dibasic salt (—SO₃MH or —SO₃M₂ wherein M is an organic or inorganic anion), a phosphoric acid (—PO₃H₂), a phosphoric acid mono- or dibasic salt (—PO₃MH or —PO₃M₂ wherein M is an organic or inorganic anion), a C1 to C12 alkyl, a C3 to C12 cycloalkyl, a C2 to C12 alkenyl, a C5 to C12 cycloalkenyl, a C2 to C12 alkynyl, a C6 to C12 aryl, a C7 to C13 arylalkylene, a C4 to C12 heterocycloalkyl, and a C3 to C12 heteroaryl instead of hydrogen, provided that the substituted atom's normal valence is not exceeded.

A C rate means a current which will discharge a battery in one hour, e.g., a C rate for a battery having a discharge capacity of 1.6 ampere-hours would be 1.6 amperes.

Hereinafter, an electrode active material according to an embodiment of the present disclosure, an electrode including the electrode active material, a secondary battery including the electrode, and a method of preparing the electrode active material will be disclosed in further detail.

According to an embodiment of the present disclosure, an electrode active material includes a vanadium oxide represented by Formula 1,

VO$_x$                                                                 Formula 1 wherein the vanadium has a mixed oxidation state of a plurality of oxidation numbers, and the oxidation numbers comprise an oxidation number of +3. In Formula 1, 1.5<x<2.5, or 1.6<x<2.4, 1.7<x<2.3, or 1.8<x<2.2.

The vanadium may have a mixed oxidation state of two or three oxidation numbers. For example, the vanadium may comprise vanadium having an oxidation number of +4 and vanadium having an oxidation number of +5. For example, the vanadium of the vanadium oxide may comprise vanadium having an oxidation number of +3, an oxidation state of oxidation number of +4, and an oxidation number of +5.

The vanadium oxide may be in the form of or comprise a nanostructure, wherein the nanostructure may be a nanotube or a nanosheet. A nanosheet may be a layer or a plurality of stacked layers.

The nanosheet may have a shape of a circle, an ellipse, a triangle, a quadrangle, a pentagon, a hexagon, or combination thereof. A nanotube may be a multiwall nanotube. Here, for example, a thickness of the multiwall may be in a range of about 30 nanometers (nm) to about 50 nm, or 35 nm to about 50 nm. In an embodiment, a thickness of the multiwall is about 40 nm.

In Formula 1 above, wherein x may satisfy the condition of 1.9≤x<2.2. For example, x may be in a range of about 1.995 to about 2.13.

FIG. 1 is a diagram illustrating an embodiment of a method of formation of a vanadium oxide as an electrode active material for a secondary battery.

Referring to FIG. 1, when divanadium pentoxide (e.g., V₂O₅), as an example of a vanadium oxide, reacts with an amine such as an amine of the formula RNH₂, according to a method of heat treatment (i.e., pathway B), the V₂O₅ is converted to vanadium in an oxidation state of 4+ and a nitro compound (e.g., a nitro compound of the formula RNO₂), thereby forming a vanadium oxide including V⁴⁺ and V⁵⁺. Here, R is a C₁-C₃₀ alkyl group.

In an embodiment, when a microwave-hydrothermal reaction of V₂O₅ occurs in the presence of an amine-based compound as a reducing agent (i.e., pathway A in FIG. 1), a vanadium oxide including V³⁺, V⁴⁺, and V⁵⁺ may be obtained. Here, synthesis conditions, such as amounts of reducing agents and microwave irradiation conditions, may be controlled, and accordingly, a shape or an interlayer distance of a finally obtained vanadium oxide may be controlled.

The amount of the reducing agent may be in a range of about 0.1 mole (mol) to about 1.1 mol, based on 1 mol of the V₂O₅.

For example, when the amount of the reducing agent is in a range of about 0.1 mol to about 0.5 mol, based on 1 mol of a starting material containing vanadium (for example V₂O₅), a vanadium oxide nanosheet may be obtained. Alternatively, when the amount of the reducing agent is in a range of about 0.6 mol to about 1.1 mol, based on 1 mol of V₂O₅ as a starting material, a vanadium oxide nanotube with a large interlayer distance may be obtained. The amount of the reducing agent may be in a range of about 0.1 mol to about 1.1 mol, or about 0.2 mol to about 1 mol, or about 0.4 mol to about 0.8 mol, or about 0.15 mol to about 0.45 mol, or about 0.2 mol to about 0.4 mol, or about 0.65 mol to about 1.05 mol, or about 0.7 mol to about 0.95 mol, based on 1 mol of a starting material containing vanadium.

While not wanting to be bound by theory, it is understood that when the V₂O₅ reacts with the amine-based compound, and microwave energy is applied thereto, energy is effectively transferred from the microwave to a reactant via a solvent, such as water, through resonance and relaxation phenomena. Accordingly, within a short time, heat of a hydrothermal synthesis reactor is uniformly and quickly supplied thereto, and the pressure of the hydrothermal synthesis reactor is increased, thereby creating a strong reducing atmosphere instantaneously. In such a strong reducing atmosphere, a vanadium oxide having a mixed oxidation state of oxidation numbers of +3, +4, and +5 may be obtained.

Alternatively, in convection heat treatment, it is difficult to obtain a vanadium oxide exhibiting a mixed oxidation state of oxidation numbers of +3, +4, and +5.

Hereinafter, an embodiment of a method of preparing the active material, will be disclosed in further detail.

A starting material containing vanadium and a reducing agent are dissolved or dispersed in a solvent to obtain a mixture. In an embodiment, the reducing agent and the solvent may first be combined, and this combination added to the starting material. Alternatively, the starting material and the reducing agent may be contacted, and this combination contacted with the solvent to provide the mixture.

The solvent may be water, an alcohol, or a combination thereof. Representative alcohols include primary and secondary alcohols, such as methanol, n-propanol, isopropanol, n-butanol, sec-butanol, isobutanol, pentanol, hexanol, 2-ethylhexanol, tridecanol, and stearyl alcohol; cyclic alcohols such as cyclohexanol, and cycloheptanol; aromatic alcohols such as benzyl alcohol, and 2-phenyl ethanol; polyhydric alcohols such as ethylene glycol, propylene glycol, 1,3-butanediol, 1,4-butanediol, 1,5-pentanediol, hexamethylene glycol, decamethylene glycol, 1,12-dihydroxyoctadecane, and glycerol; polymeric polyhydric alcohols such as polyvinyl alcohol; glycol ethers and polyalkylene glycol ethers such as methyl glycol, ethyl glycol, butyl glycol, diethylene glycol, triethylene glycol, tetraethylene glycol, higher polyethylene glycols, dipropylene glycol, tripropylene glycol, polypropylene glycol ether, and polybutylene glycol ether; aminated alcohols such as ethanolamine, propanolamine, isopropanolamine, hexanolamine, diethanolamine, diisopropanolamine, and dimethylethanolamine; and aminated polyhydric alcohols and glycol ethers such as aminated polyethylene glycol. A combination comprising at least one of the foregoing may be used. Methanol, ethanol, butanol, and propanol are specifically mentioned.

Examples of the starting material containing vanadium include divanadium pentoxide (e.g., $V_2O_5$) and a vanadium oxydiacetate (e.g., $VO(Ac)_2$, wherein Ac denotes acetate) and wherein the vanadium oxydiacetate (e.g., $VO(Ac)_2$) includes $V^{4+}$.

In a convection method of preparing an active material, a vanadium oxide gel is used as a starting material containing vanadium. However, in the method according to an embodiment of the present disclosure, a vanadium oxide, e.g., $V_2O_5$ powder, can be used as a starting material.

The reducing agent has a role in the reduction of the $V_2O_5$. While not wanting to be bound by theory, it is understood that the reducing agent may also function as a template to obtain a desirable vanadium oxide and function as a member to increase an interlayer distance of the finally obtained vanadium oxide. As is further described above, when the interlayer distance of the vanadium oxide is increased, ions such as lithium ions, magnesium ions, and sodium ions may be doped into or dedoped from the vanadium oxide. The doping process used herein refers to any process of absorption, storage, supporting, adsorption, or intercalation, and is a phenomenon by which ions, such as lithium ions, are incorporated into, e.g., intercalated into, the electrode active material. The dedoping process includes a process by which ions, such as lithium ions, are deincorporated, e.g., deintercalated, from the electrode active material.

The reducing agent may be any suitable material for reducing $V_2O_5$. For example, the reducing agent may be an amine-based material.

The reducing agent may use both the above-described amine-based material and a second reducing agent. Examples of the second reducing agent include a hydrogen compound, a cysteine-based compound, and the like.

The amine-based material may be, for example, a primary amine compound. For example, the amine-based material may be substituted or unsubstituted $C_4$-$C_{18}$ alkyl amine.

The amine-based material may comprise octadecylamine, butylamine, pentylamine, hexylamine, heptylamine, octylamine, nonylamine, decylamine, undecylamine, dodecylamine, tridecylamine, tetradecylamine, pentadecylamine, heptadecylamine, hexadecylamine, or a combination thereof. Octadecylamine is specifically mentioned.

The amount of the reducing agent may be in a range of about 0.1 mol to about 1.0 mol, or about 0.2 mol to about 0.8 mol, or about 0.3 mol to about 0.7 mol, based on 1 mol of the starting material containing vanadium (for example, $V_2O_5$). The amount of the reducing agent may significantly affect the shape and the interlayer distance of a finally obtained vanadium oxide.

The amount of the solvent may be in a range of about 100 parts by weight to about 3,000 parts by weight, based on 100 parts by weight of the $V_2O_5$. When the amount of the solvent is within this range, a mixture, in which the $V_2O_5$ and the conducting agent are uniformly dissolved or dispersed, may be obtained.

In an embodiment, the solvent may be a mixture of water and an alcohol. The water and alcohol may be combined in a volume ratio in a range of about 1:1 to about 20:1, for example, about 2:1 to about 15:1, or about 3:1 to about 10:1, or at a volume ratio of about 5:1.

An electromagnetic wave is applied to the obtained mixture to reduce the starting material, thereby obtaining a vanadium oxide represented by Formula 1.

The electromagnetic wave may be a microwave.

Reducing the starting material may be performed using a hydrothermal reaction. In an embodiment, a mixture containing the starting material including the vanadium obtained as described above, a reducing agent, and a solvent is placed in a reactor equipped with a microwave irradiation device, and the microwave-hydrothermal reaction is carried out by applying the microwaves.

After the microwave-hydrothermal reaction, the resulting material may be washed, filtered, and dried to obtain a desired vanadium oxide.

The microwave may have an output power in a range of about 200 watts (W) to about 1,500 W, and a frequency of about 2.45 gigahertz (GHz). When the microwave having an output power and a frequency within these ranges is used, a desirable vanadium oxide having a mixed oxidation state may be obtained.

The microwave may have an output power in a range of about 400 W to about 1,200 W, for example, about 800 W to about 900 W. The microwave may have a frequency in a range of about 1 GHz to about 2.45 GHz, for example, about 1.5 GHz to about 2.2 GHz. When the microwave having an output power and a frequency within these ranges is irradiated, a reaction temperature of the reactor may be in a range of about 160° C. to about 230° C. for example, about 180° C. to about 200° C.

The microwave application time may differ according to the output and the frequency of the microwave. For example, the microwave may be applied for about 12 to about 24 hours, for example, about 18 hours to about 21 hours. During such a reaction time, the microwave-hydrothermal reaction may be performed while repeatedly applying and pausing the microwaves. During the microwave-hydrothermal reaction, the pressure of the reactor may be in a range of about 150 pounds per square inch (psi) to about 250 psi.

After applying the microwave, the reaction may be maintained for about 15 hours to about 20 hours, for example, about 18 hours to about 20 hours. The reaction time using the microwave can be shorter than that of the convection heat treatment.

In the washing process, the reaction product is washed using an alcohol, water, or the like.

In the drying process, the washed product is dried at a temperature in a range of about 80° C. to about 100° C.

The obtained vanadium oxide may be pulverized to small-sized particles by ball-milling, e.g., particles having an average particle size of 0.01 micrometer (μm) to 100 μm, or 0.1 μm to 10 μm, and the pulverized product may be sieved and classified, and accordingly may be available as an electrode active material.

In an embodiment, the average oxidation number of the active material may be in a range of about 3.8 to about 4.3, for example, about 3.99 to about 4.26, or about 4.1 to about 4.2.

In Formula 1 above, x may be in a range of 1.995 to 2.13.

The obtained vanadium oxide may be formed in the shape of a nanosheet or a nanotube.

The vanadium oxide nanosheet may include 1 to 10 layers, for example 1 to 5 layers. In an embodiment, the vanadium oxide nanosheet may include 1 to 3 layers. The total thickness of the vanadium oxide nanosheet may be in a range of about 3 nm to about 15 nm, or about 5 nm to about 10 nm. The interlayer distance of the vanadium oxide nanosheet may be in a range of about 2.5 nm to about 3.5 nm, or about 2.7 nm to about 3.3 nm, for example, about 2.8 nm.

The vanadium oxide nanotube may be in the form of a cylinder having both ends open. When the interlayer distance of the vanadium oxide nanotube is long and both ends of the vanadium oxide nanotube are open, it is easy to facilitate the insertion and movement of ions such as magnesium ions, sodium ions, and lithium ions.

The vanadium oxide nanotube is not limited in length, outer diameter, and inner diameter, and any suitable length, outer diameter, and inner diameter may be used. However, in an embodiment, the nanotube may have a length of about 1 μm to about 2 μm, an inner diameter in a range of about 15 nm to about 50 nm, for example, about 30 nm to about 40 nm, and an outer diameter in a range of about 50 nm to about 100 nm, and for example, the vanadium oxide nanotube may have the outer diameter of about 80 nm. In addition, the vanadium oxide nanotube may have an interlayer distance in a range of about 2.5 nm to about 3.8 nm, for example, about 2.8 nm. In an embodiment, the vanadium oxide nanotube has a length in range of about 1 μm to about 3 μm. The vanadium oxide nanotube having such an outer diameter, an inner diameter, and a length may be used to obtain a secondary battery having excellent capacity and lifetime characteristics.

The obtained vanadium oxide nanotube may have an increased interlayer distance, and accordingly, its lifetime characteristics are excellent. The vanadium oxide nanotube may have a large surface area, and accordingly may have improved capacity characteristics.

In regard to the vanadium oxide in a mixed oxidation state, a ratio of vanadium having oxidation numbers of +3, +4, and +5 (i.e., $V^{3+}$, $V^{4+}$, and $V^{5+}$) may be measured using various methods.

For example, in X-ray photoelectron spectroscopy ("XPS") analysis, a mixing ratio of vanadium having oxidation numbers of +3, +4, and +5 (i.e., $V^{3+}$, $V^{4+}$, and $V^{5+}$) may be determined by integrating the areas of peaks corresponding to the binding energy of $V^{3+}$, $V^{4+}$, and $V^{5+}$, based on the binding energy of the V2p orbital. That is, the ratio of $V^{3+}$, $V^{4+}$, and $V^{5+}$ may be determined by a ratio of the integrated areas of the peaks.

The vanadium having an oxidation number of +3 is associated with a peak corresponding to the binding energy of 514.7±515.7 eV. The vanadium having an oxidation number of +4 is associated with a peak corresponding to the binding energy of 516.0±517.0 eV. The vanadium having an oxidation number of +5 is associated with a peak corresponding to the binding energy of 517.30±518.3 eV.

In XPS analysis, the atomic ratio of the vanadium having an oxidation number of +3 to the vanadium having an oxidation number of +4 may be about 1:1.33 to about 1:6, or about 1:1.35 to about 1:58, or about 1:1.37 to about 1:56. The atomic ratio of the vanadium having an oxidation number of +3 to the vanadium having an oxidation number of +5 may be about 1:0.83 to about 1:5, or about 1:0.9 to about 1:45, or about 1:1 to about 1:4. The atomic ratio of the vanadium having an oxidation number of +4 to the vanadium having an oxidation number of +5 may be about 1:0.42 to about 1:1.5, about 1:0.45 to about 1:1.45, or about 1:0.50 to about 1:1.4.

In XPS analysis, an amount of $V^{3+}$ may be in a range of about 10 atomic percent (atom %) to about 30 atom %, for example, about 13 atom % to about 29 atom %, based on the total amount of $V^{3+}$, $V^{4+}$, and $V^{5+}$. An amount of $V^{4+}$ may be in a range of about 40 atom % to about 60 atom %, or about 45 atom % to about 55 atom %, based on the total amount of $V^{3+}$, $V^{4+}$, and $V^{5+}$. An amount of $V^{5+}$ may be in a range of about 25 atom % to about 50 atom %, or about 30 atom % to about 45 atom %, based on the total amount of $V^{3+}$, $V^{4+}$, and $V^{5+}$.

In an X-ray diffraction ("XRD") analysis, a (001) peak and a (002) peak appear at a Bragg angle of 10° two-theta (2θ) or less when using Cu Kα radiation.

In the Examples, the XRD test was performed by using a Rigaku RINT2200HF+ diffractometer using Cu Kα radiation (1.540598 Å). The (001) peak appears at a Bragg angle of about 3.2±0.3° 2θ, and the (002) peak appears at a Bragg angle of about 6.2±0.3° 2θ.

The intensity ratio of the (002) peak to the (001) peak may be 0.6 or less, for example, in a range of about 0.3 to about 0.6. The full width at half maximum ("FWHM") of the (001) peak may be 0.5 or less, for example, in a range of about 0.1 to about 0.5.

The electrode active material when formed as nanotube may have an outer diameter in a range of about 50 nm to about 150 nm, or about 60 nm to about 140 nm, and an inner diameter in a range of about 20 to about 50 nm, or about 25 to about 45 nm. In an embodiment, a ratio of a vanadium having a mixed oxidation state of oxidation numbers of +3, +4, and +5 differs once a secondary battery employing a vanadium oxide as an active material is charged and discharged.

In another embodiment, after performing the charge and discharge of the secondary battery, the electrode active material contained in the electrode for the secondary battery includes a vanadium oxide represented by Formula 1. In an XPS analysis, an amount of vanadium having an oxidation number of +3 may be in a range of about 10 atom % to about 25 atom %, based on the total amount of vanadium having a mixed oxidation state of oxidation numbers of +3, +4, and +5:

$$VO_x \qquad \text{Formula 1}$$

wherein in Formula 1, 1.5<x<2.5, for example, 1.9≤x<2.2.

When analyzed by XPS analysis, the amount of vanadium having an oxidation number of +4 may be in a range of about 40 atom % to about 60 atom %, or about 45 atom % to about 55 atom %, based on the total amount of a vanadium having a mixed oxidation state of oxidation numbers of +3, +4, and +5, and the amount of vanadium having an oxidation number of +5 may be in a range of about 30 atom % to about 50 atom %, about 35 atom % to about 45 atom %, based on the total amounts of a vanadium having a mixed oxidation state of oxidation numbers of +3, +4, and +5. The charging and discharging may be performed by applying a constant current of about 600 mA/g (corresponding to a level of about a 0.3 C rate) within a voltage range of about −1.5 V to about 0.4 V with respect to an Ag/Ag$^+$ reference electrode (a range of about 1.5 V to about 3.4 V with respect to Mg/Mg$^{2+}$).

In an embodiment, the electrode active material may be used in a magnesium secondary battery, a sodium secondary battery, or a lithium secondary battery.

In the case of a magnesium secondary battery, a magnesium metal, which is relatively inexpensive and available in large quantities, may be used as a positive electrode, instead of lithium, which is less available. Accordingly, magnesium ions are allowed to be incorporated into, e.g., intercalate into, negative active materials or deincorporate from, e.g., deintercalate, from positive active materials to enable charge and discharge. In comparison with lithium secondary batteries, magnesium secondary batteries theoretically may have more than twice the energy density of lithium secondary batteries, and may be less expensive and more stable in air than lithium secondary batteries. In addition, magnesium secondary batteries may be eco-friendly and have excellent price competitiveness and energy storage characteristics, and thus magnesium secondary batteries may be useful as medium and large-sized batteries for power storage or electric vehicles. Magnesium secondary batteries have drawn much attention as next-generation secondary batteries.

In an embodiment, the electrode active material may be used as a magnesium electrode active material, i.e., a magnesium positive electrode active material. When the electrode active material is used as a magnesium positive electrode active material, interfacial resistance between a positive electrode active material and an electrolytic solution at an initial charge and discharge or after repeated charge and discharge cycles may decrease. In addition, due to the presence of vanadium having the oxidation number of +3 (i.e., $V^{3+}$), resistance against the movement of magnesium ions may decrease. Accordingly, lifetime characteristics of magnesium secondary batteries may be improved. In an embodiment in which a vanadium oxide nanosheet is used as the positive electrode active material, the surface area of the positive electrode active material may compared to an embodiment in which the vanadium oxide nanotube is used as the positive active material. In this regard, the interfacial resistance of the positive active material may further decrease, and the capacity of the positive active material may further increase.

In an embodiment, in a sodium secondary battery, the sodium secondary battery may be configured to include inexpensive materials, unlike lithium secondary batteries which are more costly lithium compounds, and in this regard, concerns about the supply of battery materials may be addressed. Therefore, once sodium secondary batteries are put to practical use, large-sized secondary batteries are expected to be supplied in large quantities.

The sodium secondary batteries may include a positive electrode capable of doping and dedoping sodium ions, and a negative electrode capable of doping and dedoping sodium ions. Doping, as used herein, includes alloying, incorporation, and intercalation processes.

In the case of lithium secondary batteries, lithium secondary batteries may have a high voltage, capacity, and energy density, and accordingly, have been widely used in fields of mobile phones, laptops, power plant storage batteries for wind power and solar power, electric vehicles, uninterruptible power supplies, or household batteries.

Figure 2:
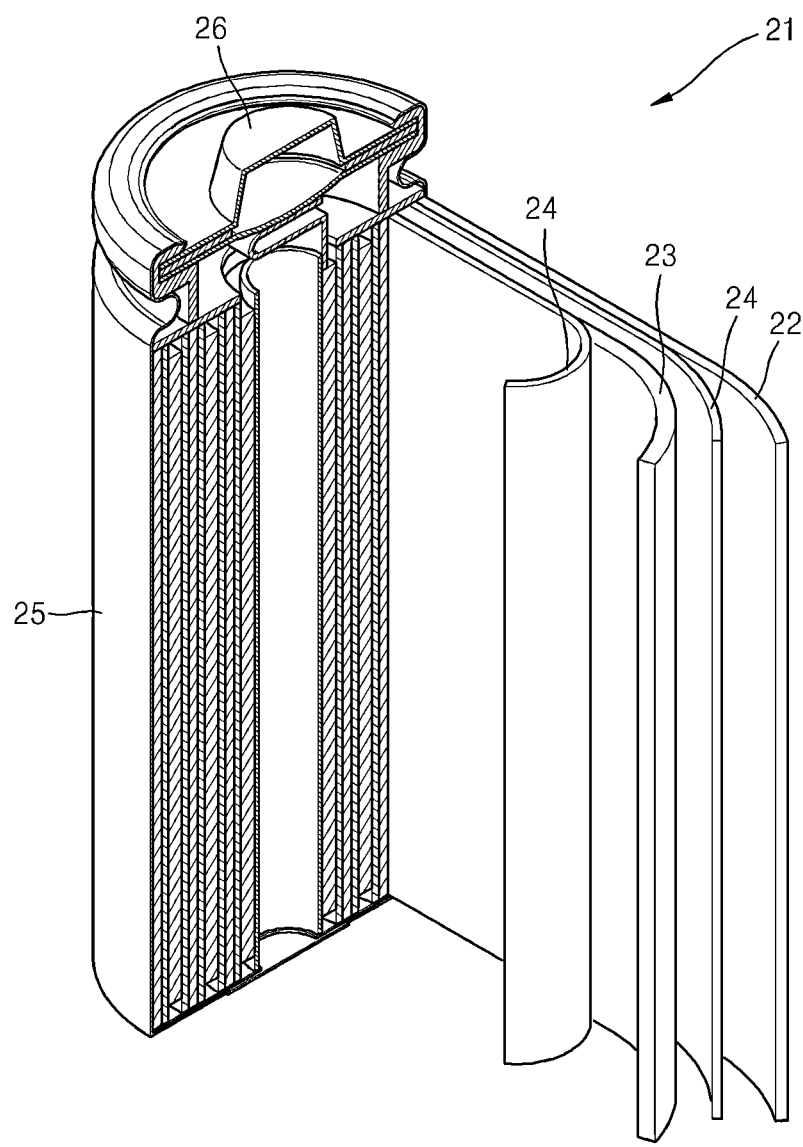
FIG. 2 is a schematic view of an embodiment of a secondary battery.

A secondary battery 21 according to an embodiment of the present disclosure is illustrated in FIG. 2. FIG. 2 is a schematic view of an embodiment of a cylindrical secondary battery. Referring to FIG. 2, the secondary battery 21 includes a positive electrode 23, a negative electrode 22, and a separator 24. The positive electrode 23, the negative electrode 22, and the separator 24 are wound or folded to be accommodated in a battery case 25. Subsequently, an electrolytic solution is loaded into the battery case 25 and then sealed with a cap assembly 26, thereby completing the manufacture of the secondary battery 21. The battery case 25 may be cylindrical, rectangular, or thin film-shaped. For example, the secondary battery 21 may be a large, thin film-type battery. Alternatively, the secondary battery 21 may be a lithium ion battery.

A separator is disposed between a positive electrode plate and a negative electrode plate to form a battery assembly. A plurality of battery assemblies may be stacked in a bi-cell structure, and then impregnated with an organic electrolytic solution. The obtained structure is housed in a pouch, followed by sealing, thereby completing the manufacture of a lithium ion polymer battery.

In addition, a plurality of the battery assemblies may be stacked on each other to form a battery pack, and the battery pack may be used in various devices that require high capacity. For example, the battery pack may be used in a laptop, a smartphone, or an electric vehicle.

Hereinafter, each component of the secondary battery will be described in further detail.

Positive Electrode

According to an embodiment of the present disclosure, a positive electrode includes a vanadium oxide represented by Formula 1, wherein vanadium of the vanadium oxide has a mixed oxidation state of oxidation numbers of +3, +4, and +5:

$$VO_x \qquad \text{Formula 1}$$

wherein in Formula 1, 1.5<x<2.5, for example, 1.9≤x<2.2.

In an embodiment, the active material may have an average oxidation number in a range of about 3.8 to about 4.3, for example, about 3.99 to about 4.26.

A positive electrode may be prepared in the following manner:

For example, a positive active material, a conducting agent, a binder, and a solvent are mixed to prepare a positive active material composition. The positive active material composition may be coated directly on a metal current collector to prepare a positive electrode plate. Alternatively, the positive active material composition may be cast onto a separate support, and a film separated from the separate support may be laminated on a metal current collector to prepare a positive electrode plate. The positive electrode is not limited to the above-described formations, and may be formed in any of various formations other than the above-described formations.

The conducting agent may be acetylene black, Ketjen black, natural graphite, artificial graphite, carbon black, carbon fiber, metal powder or metal fiber of copper, nickel, aluminum, or silver, or a conducting agent such as a polyphenylene derivative, or a combination thereof. However, the conducting agent is not limited thereto, and may be any suitable material that is used as a conducting agent in the art.

The binder may be a polyvinyl alcohol, carboxymethyl cellulose, hydroxypropyl cellulose, diacetyl cellulose, polyvinylchloride, carboxylated polyvinylchloride, polyvinyl fluoride, a polymer including ethylene oxide, polyvinylpyrrolidone, polyurethane, polytetrafluoroethylene, polyvinylidene fluoride, polyethylene, polypropylene, styrene-butadiene rubber, polyamide imide, acrylated styrene-butadiene rubber, epoxy resin, nylon, or a combination thereof. However, the binder is not limited thereto, and may be any suitable material that is used as a binder in the art.

The solvent may be N-methylpyrrolidone, acetone, water, or combination thereof. However, the solvent is not limited thereto, and may be any suitable material that is used as a solvent in the art.

The amounts of the positive active material, the conducting agent, the binder, and the solvent may be determined by one of skill in the art without undue experimentation. According to the purpose and structure of a lithium battery, one or more of the conducting agent, the binder, and the solvent may be omitted if desired.

In the case of a magnesium secondary battery, a positive electrode may further include a commercially available positive active material. The amount of the commercially available positive active material may be in a range of about 50 parts by weight about 98 parts by weight, based on 100 parts by weight of the total weight of the commercially available positive active material.

The commercially available positive active material may include a transition metal or a magnesium composite metal oxide, wherein the transition metal enables intercalation and deintercalation of magnesium ions. For example, the commercially available positive active material may include and oxide, sulfide, and halide of a metal such as scandium (Sc), ruthenium (Ru), titanium (Ti), vanadium (V), molybdenum (Mo), chromium (Cr), manganese (Mn), iron (Fe), cobalt (Co), nickel (Ni), copper (Cu), or zinc (Zn), or a magnesium composite metal oxide, or a combination thereof.

For example, the commercially available positive active material may be $TiS_2$, $ZrS_2$, $RuO_2$, $Co_3O_4$, $Mo_6S_8$, or $V_2O_5$, but is not limited thereto. The magnesium composite metal oxide may be, for example, a magnesium-based compound represented by the formula $Mg(M_{1-x}A_x)O_4$ (where x satisfies $0 \leq x \leq 0.5$, M is Ni, Co, Mn, Cr, V, Fe, Cu, or Ti, and A is Al, B, Si, Cr, V, C, Na, K, or Mg).

In the case of the magnesium secondary battery, the current collector should be stable without causing electrochemical changes in the fabricated battery. If the current collector corrodes, the battery may not have sufficient current collecting capabilities with repeated cycles of the battery, resulting in a reduced battery lifetime.

The current collector may comprise stainless steel. For example, the current collector may comprise a material coated with a primer including a conducting agent and a polymer material on a metallic base.

Any suitable metal may be used without limitation as the metallic base so long as it is stable at an electric potential of the magnesium secondary battery and as sufficient electrical conductivity. Examples of the metal include stainless steel, nickel, and titanium, and for example, the metal may be stainless steel. The metallic base may have a thickness of about 1 μm to about 150 μm and may be in any suitable form including foils, films, sheets, nets, porous structures, and foams, and for example, the metallic base may be foils.

The primer may suppress an increase of internal resistance as much as possible and increases adhesive strength of the positive active material to the metallic base. For example, the weight ratio of the conducting agent to the polymer material may be in a range of 1:10 to 10:1. When the amount of the conducting agent is within this range, desired adhesive strength may be obtained without deteriorating the operating characteristics of the battery due to the increase in internal resistance.

Examples of the conducting agent include graphite, carbon black, acetylene black, Ketjen black, channel black, furnace black, lamp black, thermal black, carbon fiber, carbon fluoride, or a combination thereof, but are not limited thereto. For example, the conducting agent may be carbon black. The conducting agent may have a particle diameter of about 10 nm to about 100 nm.

Examples of the polymer material include a polyimide copolymer, acrylate copolymer, polyvinylidene fluoride, polyvinyl alcohol, carboxymethyl cellulose ("CMC"), starch, hydroxypropyl cellulose, regenerated cellulose, polyvinylpyrrolidone, tetrafluoroethylene, polyethylene, polypropylene, ethylene-propylene-diene terpolymer ("EPDM"), sulfonated EPDM, styrene-butadiene rubber, fluororubber, or a combination thereof, but are not limited thereto. For example, polyimide copolymer is specifically mentioned.

A primer layer may have a thickness of about 100 nm to about 1 μm and may be a film-type primer layer with a uniform thickness or a cluster-type primer layer without a uniform thickness. For example, since the cluster-type primer layer has a high specific surface area, it provides better adhesive strength than the film-type primer layer when the positive active material is attached thereto. Here, the cluster-type primer layer may be formed of stainless steel as the metallic base.

The primer may be coated on one or both surfaces of the current collector. In an embodiment, the primer may be coated on both surfaces of the current collector.

The primer may be applied to a surface of the current collector by using, for example, a method including preparing a coating solution by adding the conducting agent and the polymer to a predetermined volatile solvent, coating the solution on the current collector, and removing the solvent. Examples of the volatile solvent include NMP, water, methyl isobutyl ketone ("MIBK"), and isopropanol, but are not limited thereto.

In the case of the sodium secondary battery, the positive electrode may include a commercially available positive active material for the sodium secondary battery other than the vanadium oxide represented by Formula 1 according to an embodiment of the present disclosure, wherein vanadium has a mixed oxidation state of oxidation numbers of +3, +4, and +5. Here, the amount of the commercially available positive active material may be in a range of about 50 parts by weight to about 98 parts by weight, based on 100 parts by weight of the total amount of the commercially available positive active material.

Examples of the commercially available positive active material include metal sulfides such as $Ag_2S$, $As_2S_3$, CdS, CuS, $Cu_2S$, FeS, $FeS_2$, HgS, $MoS_2$, $Ni_3S_2$, NiS, $NiS_2$, PbS, $TiS_2$, MnS, and $Sb_2S_3$, or a mixture of metal sulfides and transition metals, or a combination thereof. Examples of the transition metals include scandium (Sc), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), technetium (Tc), ruthenium (Ru), rhodium (Rh), palladium (Pd), silver (Ag), cadmium (Cd), lutetium (Lu), hafnium (Hf), tantalum (Ta), tungsten (W), rhenium (Re), osmium (Os), iridium (Ir), platinum (Pt), gold (Au), mercury (Hg), lawrencium (Lr), rutherfordium (Rf), dubnium (Db), seaborgium (Sg), bohrium (Bh), hassium (Hs), meitnerium (Mt), darmstadtium (Ds), roentgenium (Rg), or ununbium (Uub), or a combination thereof.

In the case of the lithium secondary battery, the positive electrode may include a commercially available positive electrode active material for a lithium secondary battery, other than vanadium oxide described above. Here, the amount of the commercially available positive electrode active material may be in a range of about 70 parts by weight to about 98 parts by weight, based on 100 parts by weight of the total amount of the commercially available positive electrode active material.

Examples of the commercially available positive electrode active material include lithium cobalt oxide, lithium nickel cobalt manganese cobalt oxide, lithium nickel cobalt aluminum oxide, lithium iron phosphate oxide, lithium manganese oxide, or a combination thereof, but are not limited thereto. Any suitable commercially available positive electrode active material that is available in the art may be used, if desired.

For example, the commercially available positive electrode active material may be a compound represented by any of various formulae including $Li_aA_{1-b}Z_bD_2$ where $0.90 \le a \le 1.8$ and $0 \le b \le 0.5$; $Li_aE_{1-b}Z_bO_{2-c}D_c$ where $0.90 \le a \le 1.8$, $0 \le b \le 0.5$, and $0 \le c \le 0.05$; $LiE_{2-b}Z_bO_{4-c}D_c$ where $0 \le b \le 0.5$ and $0 \le c \le 0.05$; $Li_aNi_{1-b-c}Co_bZ_cD_\alpha$ where $0.90 \le a \le 1.8$, $0 \le b \le 0.5$, $0 \le c \le 0.05$, and $0 < \alpha \le 2$; $Li_aNi_{1-b-c}Co_bZ_cO_{2-\alpha}F_\alpha$ where $0.90 \le a \le 1.8$, $0 \le b \le 0.5$, $0 \le c \le 0.05$, and $0 < \alpha < 2$; $Li_aNi_{1-b-c}Co_bZ_cO_{2-\alpha}F_2$ where $0.90 \le a \le 1.8$, $0 \le b \le 0.5$, $0 \le c \le 0.05$, and $0 < \alpha < 2$; $Li_aNi_{1-b-c}Mn_bZ_cD_\alpha$ where $0.90 \le a \le 1.8$, $0 \le b \le 0.5$, $0 \le c \le 0.05$, and $0 < \alpha < 2$; $Li_aNi_{1-b-c}Mn_bZ_cO_{2-\alpha}F_\alpha$ where $0.90 \le a \le 1.8$, $0 \le b \le 0.5$, $0 \le c \le 0.05$, and $0 < \alpha < 2$; $Li_aNi_{1-b-c}Mn_bZ_cO_{2-\alpha}F_2$ where $0.90 \le a \le 1.8$, $0 \le b \le 0.5$, $0 \le c \le 0.05$, and $0 < \alpha < 2$; $Li_aNi_bE_cG_dO_2$ where $0.90 \le a \le 1.8$, $0 \le b \le 0.9$, $0 \le c \le 0.5$, and $0.001 \le d \le 0.1$; $Li_aNi_bCo_cMn_dGeO_2$ where $0.90 \le a \le 1.8$, $0 \le b \le 0.9$, $0 \le c \le 0.5$, $0 \le d \le 0.5$, and $0.001 \le e \le 0.1$; $Li_aNiG_bO_2$ where $0.90 \le a \le 1.8$ and $0.001 \le b \le 0.1$; $Li_aCoG_bO_2$ where $0.90 \le a \le 1.8$ and $0.001 \le b \le 0.1$; $Li_aMnG_bO_2$ where $0.90 \le a \le 1.8$ and $0.001 \le b \le 0.1$; $Li_aMn_2G_bO_4$ where $0.90 \le a \le 1.8$ and $0.001 \le b \le 0.1$; $QO_2$; $QS_2$; $LiQS_2$; $V_2O_5$; $LiV_2O_5$; $LiRO_2$; $LiNiVO_4$; $Li_{(3-f)}J_2(PO_4)_3$ where $0 \le f \le 2$; $Li_{(3-f)}Fe_2(PO_4)_3$ where $0 \le f \le 2$; and $LiFePO_4$.

In the formulae above, A is Ni, Co, Mn, or a combination thereof; Z is Al, Ni, Co, Mn, Cr, Fe, Mg, Sr, V, a rare earth element, or a combination thereof; D is O, F, S, P, or a combination thereof; E is Co, Mn, or a combination thereof; F is F, S, P, or a combination thereof; G is Al, Cr, Mn, Fe, Mg, La, Ce, Sr, V, or a combination thereof; Q is Ti, Mo, Mn, or a combination thereof; R is Cr, V, Fe, Sc, Y, or a combination thereof; and J is V, Cr, Mn, Co, Ni, Cu, or a combination thereof.

A coating layer may be further formed on the surfaces of these compounds, or a mixture of these compounds and a compound that forms a coating layer may be also used. The coating layer may be an oxide of a coating element, a hydroxide of a coating element, an oxyhydroxide of a coating element, an oxycarbonate of a coating element, or a hydroxycarbonate of a coating element. The compound that forms the coating layer may be amorphous or crystalline. The coating element contained in the coating layer may be Mg, Al, Co, K, Na, Ca, Si, Ti, V, Sn, Ge, Ga, B, As, Zr, or a combination thereof. The coating layer forming process may be any suitable coating methods (for example, spray coating or precipitating) that do not adversely affect properties of the positive active material when these elements are used with respect to the compounds. Details of the coating layer forming process may be determined by one of ordinary skill in the art without undue experimentation, and thus will not be described herein in further detail.

For example, $LiNiO_2$, $LiCoO_2$, $LiMn_xO_{2x}$ (x=1 or 2), $LiNi_{1-x}Mn_xO_2$ ($0<x<1$), $LiNi_{1-x-y}Co_xMn_yO_2$ ($0 \le x \le 0.5$, $0 \le y \le 0.5$), $LiFeO_2$, $V_2O_5$, TiS, or MoS may be used.

In the case of the lithium secondary battery, the current collector may have a thickness of about 3 μm to about 500 μm. Any suitable material may be used without limitation as the current collector so long as it has high conductivity without causing adverse chemical changes in the fabricated battery. Examples of suitable materials as the current collector include stainless steel, aluminum, nickel, titanium, heat-treated carbon, or a material treated with carbon, nickel, titanium, or silver on the surface of aluminum or stainless steel. The current collector forms a micro-sized uneven surface so that the positive active material may have great adhesive strength. The current collector may be formed in a variety of shapes such as a film, a sheet, a foil, a net, a porous structure, a blowing agent, and a non-woven fabric.

Negative Electrode

The negative electrode in a magnesium secondary battery may include a magnesium metal, a magnesium metal-based alloy, or a magnesium intercalating compound, but is not limited thereto. Any suitable material available as a negative active material that includes magnesium or that is capable of intercalating/deintercalating magnesium in the art may be used.

The negative electrode may be, for example, a magnesium metal. The magnesium metal-based alloy may be, for example, an alloy of magnesium with aluminum, tin, indium, calcium, titanium, or vanadium.

For example, the negative electrode may be magnesium metal with a thickness in a range of about 3 μm to about 500 μm. Further, the magnesium metal may be used in a variety of shapes such as a film, a sheet, a foil, a net, a porous structure, a blowing agent, and a non-woven fabric.

The negative electrode in a sodium secondary battery may be an electrode including a sodium metal or a sodium alloy, or may be an electrode formed by stacking a sodium metal or a sodium alloy on a current collector. Alternatively, the negative electrode may be a sodium inorganic compound (hereinafter referred to as "sodium compound") capable of doping and dedoping sodium ions.

Examples of the sodium inorganic compound include an oxide represented by $NaM1_aO_2$ (where M1 is at least one transition metal element and $0 \le a < 1$), for example, $NaFeO_2$, $NaMnO_2$, $NaNiO_2$, and $NaCoO_2$, an oxide represented by $Na_{0.44}Mn_{1-a}M1_aO_2$ (where M1 is at least one transition metal element and $0 \le a < 1$), an oxide represented by $Na_{0.7}Mn_{1-a}M1_aO_{2.05}$ (where M1 is at least one transition metal element and $0 \le a < 1$); an oxide represented by $Na_bM2_cSi_{12}O_{30}$, for example, $Na_6Fe_2Si_{12}O_{30}$ and $Na_2Fe_5Si_{12}O_{30}$ (where M2 is at least one transition metal element, $2 \le b \le 6$, and $2 \le c \le 5$); an oxide represented by $Na_dM3_eSi_6O_{18}$, for example, $Na_2Fe_2Si_6O_{18}$ and $Na_2MnFeSi_6O_{18}$ (where M3 is at least one transition metal element, $3 \le d \le 6$, and $1 \le e \le 2$); an oxide represented by $Na_fM4_gSi_2O_6$, for example, $Na_2FeSiO_6$ (where M4 is at least one transition metal element selected from Mg and Al, and $1 \le f \le 2$, $1 \le g \le 2$); phosphate of $NaFePO_4$, $Na_3Fe_2(PO_4)_3$; borate of $NaFeBO_4$, $Na_3Fe_2(BO_4)_3$; and fluoride represented by $Na_hM_5F_6$ (where $M_5$ is at least one transition metal element and $2 \le h \le 3$), for example, $Na_3FeF_6$ and $Na_2MnF_6$.

The negative electrode in the lithium secondary battery may be selected from the group consisting of a carbonaceous material such as graphite and carbon, a lithium metal, and an alloy thereof, Si, SiOx (wherein $0<x<2$, e.g., a range of 0.5 to 1.5), Sn, $SnO_2$, a silicon alloy, and a combination thereof.

The silicon alloy may be prepared using silicon and Al, Sn, Ag, Fe, Bi, Mg, Zn, in, Ge, Pb, or Ti, or a combination thereof.

The negative active material may be a metal or metalloid that is alloyable with lithium, an alloy of the metal or metalloid, an oxide of the metal or metalloid, or combination thereof. For example, the metal or metalloid that is alloyable with lithium may be Si, Sn, Al, Ge, Pb, Bi, Sb Si—X alloy (where X is an alkali metal, an alkali earth metal, a Group 13 element, a Group 14 element, a transition metal, a rare earth element, or a combination thereof but is not Si), Sn—X alloy (where X is an alkali metal, an alkali earth metal, a Group 13 element, a Group 14 element, a transition metal, a rare earth element, or a combination thereof but is not Sn), or the like. The element X may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof. For example, the oxide of the metal or metalloid may be a lithium titanium oxide, a vanadium oxide, a lithium vanadium oxide, $SnO_2$, $SiO_x$ ($0<x<2$), or the like.

The negative active material may be a combination of silicon, silicon oxide, silicon alloy, or graphite. Alternatively, the negative active material may be a composite including silicon, silicon oxide, silicon alloy, or graphite, or a combination thereof.

For example, the negative active material may be in the form of a simple particle. The negative active material may have a nano-sized nanostructure. For example, the negative active material may be formed in a variety of shapes such as a nanoparticle, a nanowire, a nanorod, a nanotube, or a nanobelt, or a combination thereof.

For example, the negative electrode may be metal with a thickness in a range of about 3 μm to about 500 μm. Further, sodium metal may be formed in a variety of shapes such as a film, a sheet, a foil, a net, a porous structure, a blowing agent, and a non-woven fabric.

According to another embodiment of the present disclosure, a negative electrode for a secondary battery may be prepared in the following manner:

For example, a negative active material composition including a negative active material, a conducting agent, and a binder may be molded into a regular shape. Alternatively, the negative active material composition may be coated on a current collector such a copper foil.

The negative active material may be used for magnesium secondary batteries, sodium secondary batteries, or lithium secondary batteries In detail, a negative active material, a conducting agent, a binder, and a solvent are mixed to prepare a negative active material composition. The negative active material composition may be coated directly on a metal current collector to prepare a negative electrode. Alternatively, the negative active material composition may be cast onto a separate support and a film separated from the separate support may be laminated on a metal current collector to prepare a negative electrode. The negative electrode is not limited to the above-described formations, and may be formed in any suitable manner.

The amount of the binder in the negative active material may be in a range of about 1 to 10 parts by weight, for example, 1 to 3 parts by weight, based on 100 parts by weight of the total weight of the negative active material composition.

A method of coating the negative active material composition on a current collector may be selected according to viscosity of the composition. For example, screen printing, spray coating, coating using a doctor blade, gravure coating, deep coating, silk-screening, painting, or slot die coating, or a combination thereof may be selected and performed.

Any suitable material may be used without limitation as the current collector so long as it has high conductivity without causing adverse chemical changes in the fabricated battery. Examples of suitable materials as the current collector include copper, stainless steel, aluminum, nickel, titanium, heat-treated carbon, a material treated with carbon, nickel, titanium, or silver on the surface of copper or stainless steel, or an aluminum-cadmium alloy, or a combination thereof.

In addition, the current collector may comprise a micro-uneven surface so that the negative active material may have great adhesive strength. The current collector may be formed in a variety of shapes such as a film, a sheet, a foil, a net, a porous structure, a blowing agent, and a non-woven fabric.

The current collector may be generally prepared to a thickness in a range of about 3 μm to about 20 μm.

In an embodiment, the negative active material composition is coated on a current collector and/or a substrate, and a first heat treatment is performed thereon at a temperature in a range of about 80° C. to about 120° C. to dry and remove the solvent. The obtained product is then rolled and dried again to obtain a negative electrode.

When the first heat treatment is performed, the solvent, such as water, is removed from the negative electrode. Accordingly, when the temperature during the drying process is within the range, bubble generation on the electrode surface is suppressed, and an electrode having excellent surface uniformity may be obtained. Here, the drying may be performed in an air atmosphere.

After the first heat treatment, a second heat treatment may be performed under vacuum conditions a pressure in a range of about $1\times10^{-4}$ torr to about $1\times10^{-6}$ torr and a temperature in a range of about 100° C. to about 200° C.

The negative active material composition may further include another carbonaceous negative active material other than the above-described negative active material.

For example, the carbonaceous negative active material may be crystalline carbon, amorphous carbon, or a combination thereof. The crystalline carbon may be natural or artificial graphite and may have any suitable form, and may be in a shape of a plate, flake, sphere, or fiber form. The amorphous carbon may be soft carbon (e.g., low-temperature sintered carbon), hard carbon, a mesophase pitch carbide, sintered coke, graphene, carbon black, fullerene soot, carbon nanotubes, carbon fiber, or the like, or a combination thereof, but is not limited thereto. Any suitable material that may be used in the art as the negative active material may be used.

The conducting agent may include acetylene black, Ketjen black, natural graphite, artificial graphite, carbon black, carbon fiber; metal powder or metal fiber of copper, nickel, aluminum, silver, or the like; or a polyphenylene derivative, or a combination thereof. However, the conducting agent is not limited thereto, and may be any suitable material that is used as a conducting agent in the art. However, the conducting agent is not limited thereto, and may be any suitable material that is used as a conducting agent in the art.

The negative electrode may further include a commercially available binder in addition to the above-described binder. For example, the commercially available binder may be sodium-carboxymethyl cellulose ("Na-CMC"), an alginic acid derivative, a chitosan derivative, polyvinyl alcohol ("PVA"), polyacrylic acid ("PAA"), sodium polyacrylate ("Na-PAA"), polyvinylpyrrolidone ("PVP"), polyacrylamide ("PAAm"), vinylidene fluoride/hexafluoropropylene copolymer ("P(VDF-HFP)"), polyvinylidene fluoride ("PVDF"), polyacrylonitrile ("PAN"), aqueous dispersion type styrene-butadiene rubber ("SBR"), aqueous distributed butadiene rubber ("BR"), a modified product thereof, a polymer substituted with fluorine thereof, a polymer substituted with a sulfone group (—$SO_2$—) on a main chain thereof, or random copolymer, block copolymer, or alternating copolymer including repeating units of the polymers, but is not limited thereto. Any suitable material available as a binder in the art may be used.

Any suitable material may be used without limitation as the current collector so long as it has high conductivity without causing adverse chemical changes in the fabricated battery. Examples of suitable materials as the current collector include copper, stainless steel, aluminum, nickel, titanium, heat-treated carbon, a material treated with carbon, nickel, titanium, or silver on the surface of copper or stainless steel, or an aluminum-cadmium alloy.

In addition, the current collector may comprise a micro-uneven surface so that the negative active material may have great adhesive strength. The current collector may be formed in a variety of shapes such as a film, a sheet, a foil, a net, a porous structure, a blowing agent, and a non-woven fabric.

Separator

The secondary battery may further include the separator disposed between the positive electrode and the negative electrode.

The separator may be a thin film that is disposed between the positive electrode and the negative electrode and has high ion permeability and mechanical strength.

The separator may have a pore diameter in a range of about 0.001 µm to about 10 µm, and a thickness in a range of about 5 µm to about 20 µm. The separator having these ranges may be an olefin polymer such as chemical resistance and hydrophobic polypropylene; a sheet or a non-woven fabric including glass fibers or polyethylene materials. When a solid electrolyte such as a polymer is used as an electrolyte, the solid electrolyte may also serve as a separation membrane.

Examples of the olefin polymer are polyethylene, polypropylene, and polyvinylidene fluoride, and the olefin polymer may have a multi-layer structure including two or more polymer layers. That is, the separator may have a mixed multi-layer structure, such as a two-layer separator of polyethylene/polypropylene, a three-layer separator of polyethylene/polypropylene/polyethylene, and a three-layer separator of polypropylene/polyethylene/polypropylene.

For example, the separator may be prepared in the following manner:

A polymer resin, a filler, and a solvent may be mixed to prepare a separator composition. Then, the separator composition may be directly coated on a negative active material layer and dried to form a separator. Alternatively, the separation composition may be cast onto a support and dried to form a separator film, and the separator film separated from the support may be laminated on a negative active material layer to prepare a separator.

The polymer resin used to prepare the separator is not particularly limited and may be any suitable material that is commonly used as a binder for electrode plates. For example, the polymer resin may be polyethylene, polypropylene, vinylidene fluoride/hexafluoropropylene copolymer, polyvinylidene fluoride ("PVDF"), polyacrylonitrile, polymethyl methacrylate, or a combination thereof. The filler may include inorganic particles or the like. The solvent may be any suitable solvent that is capable of dissolving the polymer resin and capable of forming pores in the polymer resin during a drying process and is commonly used in the art.

Alternatively, the separator may be separately prepared and laminated on the negative active material layer according to other known methods. For example, a dry method for forming a microporous membrane may be used, wherein polypropylene and polyethylene may be melted and extruded to prepare a film, and then the film may be annealed at a low temperature to grow crystalline domains. Then, the crystalline domains may be stretched to extend amorphous regions. Also, for example, a wet method for forming a microporous membrane may be used, wherein other small molecule materials such as a hydrocarbon solvent are mixed with polypropylene, polyethylene, and the like to form a mixture. A film is formed using the mixture, and subsequently, the solvent and the small molecules may be removed from the film by using another volatile solvent, while the solvent or the small molecules, gathered in amorphous phases, start forming an island phase within the film.

Also, the separator may further include an additive, such as non-conductive particles, other fillers, or a fiber compound to control a degree of strength or hardness and thermal shrinkage rate. For example, the separator may further include inorganic particles. Thus, the oxidation resistance of the separator may be improved and the degradation of battery characteristics may be suppressed. The inorganic particles may include a metal oxide, such as alumina ($Al_2O_3$), silica ($SiO_2$), or titania ($TiO_2$). An average particle diameter of the inorganic particles may be in a range of about 10 nm to about 5 µm. When the average particle diameter is within this range, the dispersion of the inorganic particles may be performed smoothly without deterioration of the crystallinity of the inorganic particles.

The separator may have a multi-layer structure including one or more polymer layers to increase tearing strength or mechanical strength. Examples of the structure of the separator may be a laminated structure of one or more selected from polyethylene/polypropylene, a laminated structure of polyethylene/polypropylene/polyethylene, and a laminated structure of non-woven fabric/polyolefin.

Electrolyte

When a secondary battery is a lithium secondary battery, an electrolyte may include a nonaqueous electrolyte and a lithium salt. For example, the lithium secondary battery illustrated in FIG. 1 may comprise a nonaqueous electrolytic solution as an electrolyte.

Examples of the nonaqueous electrolyte include a nonaqueous electrolytic solution, an organic solid electrolyte, and an inorganic solid electrolyte.

The nonaqueous electrolytic solution may be, for example, N-methyl-2-pyrrolidinone, propylene carbonate, ethylene carbonate, butylenes carbonate, dimethyl carbonate, diethyl carbonate, gamma-butyrolactone, 1,2-dimethoxyethane, tetrahydroxyfuran, 2-methyltetrahydrofuran, dimethyl sulfoxide, 1,3-dioxolane, formamide, dimethyl formamide, acetonitrile, nitromethane, methyl formate, methyl acetate, phosphate triester, trimethoxylmethane, a dioxolane derivate, sulfolane, methyl sulfolane, 1,3-dimethyl-2-imidazolidinone, a propylene carbonate derivative, a tetrahydrofuran derivate, ether, methylpropionic acid, ethyl propionic acid, or fluoroethylene carbonate ("FEC"), or a combination thereof.

The organic solid electrolyte may be, for example, a polyethylene derivate, a polyethylene oxide derivate, a polypropylene oxide derivate, phosphate ester polymer, polyester sulfide, polyvinyl alcohol, polyvinylidene fluoride, or polymer containing an ionic dissociable group.

The inorganic solid electrolyte may include, for example, $Li_3N$, $LiI$, $Li_5NI_2$, $Li_3N$—$LiI$—$LiOH$, $Li_2SiS_3$, $Li_4SiO_4$, $Li_4SiO_4$—$LiI$—$LiOH$, or $Li_3PO_4$—$Li_2S$—$SiS_2$.

The lithium salt is a material that is easily dissolved in the nonaqueous electrolyte, and examples thereof include $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, lithium chloroborane, lithium lower aliphatic carboxylate, and lithium tetrakisphenyl borate. In addition, to improve charge and discharge characteristics and flame retardancy of the nonaqueous electrolyte, the non-aqueous electrolyte may further include, for example, pyridine, triethyl phosphate, triethanolamine, cyclic ethers, ethylenediamine, n-glyme, hexaphosphoric triamide, nitrobenzene derivative, sulphur, quinoneimine dye composition, N-substituted oxazolidinon, N,N-substituted imidazolidine, ethylene glycol dialkyl ethers, ammonium salt, pyrrole, 2-methoxy ethanol, or aluminum trichloride. If necessary, to provide non-combustibility, halogen-containing solvents such as carbon tetrachloride and ethylene trifluoride may be further included. In addition, to improve a conserved property of the batteries at a high temperature, gas such as carbon dioxide may be further included.

The concentration of the lithium salt may be in a range of about 0.1 M to about 2M, for example, in a range of about 0.5 M to about 1.5 M. When the concentration of the lithium salt is within this range, the lithium secondary battery may have high capacity and long lifetime characteristics.

When the electrolyte is a solid electrolyte such as polymer electrolyte, the solid electrolyte may additionally function as the above-described separator. In this case, a separate separator is optional.

When a secondary battery is a magnesium secondary battery, an electrolyte may include a magnesium salt and a non-aqueous organic solvent. In order to ensure reliable operation of the battery, any suitable material that may form an electrochemically stable electrolytic solution compared to magnesium in a voltage of 1V or higher, may be used. Examples of the magnesium salt include RMgX (where R may be a $C_1$ to $C_{10}$ linear or branched alkyl group, a $C_6$ to $C_{10}$ linear or branched aryl group, or a $C_1$ to $C_{10}$ linear or branched amine group), MgX2 (where X may a halogen atom), $R_2Mg$ (where R is a $C_1$ to $C_{20}$ alkyl group, a $C_1$ to $C_{20}$ dialkyl boron group, a $C_6$ to $C_{20}$ diaryl boron group, a $C_1$ to $C_{20}$ alkylcarbonyl group, a $C_1$ to $C_{20}$ alkylsulfonyl group), $MgClO_4$, or a combination including at least one examples therefrom. However, the magnesium salt is not limited thereto.

Regarding RMgX, R may be, in detail, a methyl group, an ethyl group, a butyl group, a phenyl group, or an aniline group, X may be a halogen atom such as chloride and bromine. Regarding $MgX_2$, X may be chloride or bromine.

Regarding $R_2Mg$, the alkylcarbonyl group may be, for example, a methylcarbonyl group ($-CO_2CH_3$), and the alkylsulfonyl group may be, for example, a trifluoromethylsulfonyl group ($-SO_2CF_3$).

The magnesium salt may include, for example, $Mg(AlCl_2BuEt)_2$ (where Bu is a an abbreviation of butyl group and Et is an abbreviation of ethyl group), $Mg(ClO_4)_2$, $Mg(PF_6)_2$, $Mg(BF_4)_2$, $Mg(CF_3SO_3)_2$, $MgN(CF_3SO_2)_2$, $MgN(C_2F_5SO_2)_2$, or $MgC(CF_3SO_2)_3$.

The concentration of the magnesium salt may be appropriately determined according to the solubility of the electrolyte in the electrolytic solution. The concentration of the magnesium salt is generally in a range of about 0.2 M to about 5 M, for example, about 0.3 M to about 3 M. In an embodiment, the concentration of the magnesium salt may be in a range of about 0.8 M to about 1.5. When the concentration of the magnesium salt is within this range, the magnesium secondary battery may have excellent internal resistance characteristics.

The magnesium secondary battery may use a non-aqueous organic solvent having large oxidation potential and capable of dissolving the sodium salt. The non-aqueous organic solvent may include carbonates, ether-based solvents, or ether-based solvents. For example, propylene carbonate, ethylene carbonate, fluoroethylene carbonate, butylene carbonate, dimethyl carbonate, diethyl carbonate, methyl ethyl carbonate, methyl propyl carbonate, ethylpropyl carbonate, methyl isopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolane, N,N-dimethylformamide, N,N-dimethylacetamide, N,N-dimethylsulfoxide, dioxane, 1,2-dimethoxyethane, sulfolane, dichloroethane, chlorobenzene, nitrobenzene, diethylene glycol, tetrahydrofuran, dimethyl ether, or a combination thereof.

The electrolyte may further include various additives, if desired. For example, in consideration of improvement of charge and discharge characteristics and flame retardancy of the nonaqueous electrolyte, the electrolyte may further include pyridine, triethyl phosphate, triethanolamine, cyclic ethers, ethylenediamine, n-glyme, hexamethylphosphoramide, nitrobenzene derivate, sulphur, quinoneimine dye composition, N-substituted oxazolidinone, N,N-substituted imidazolidine, ethylene glycol dialkyl ethers, ammonium salt, pyrrole, 2-methoxy ethanol, or aluminum trichloride. For example, in consideration of providing non-combustibility, the electrolyte may further include halogen-containing solvents such as carbon tetrachloride and ethylene trifluoride.

The electrolyte for the magnesium secondary battery may have a composition including $Mg(AlCl_2BuEt)_2$/THF.

The electrolyte for the sodium secondary battery may include a sodium salt and a non-aqueous organic solvent.

Any suitable material that is generally used as a sodium salt in the art may be used, and examples thereof include $NaClO_4$, $NaPF_6$, $NaBF_4$, $NaCF_3SO_3$, $NaN(CF_3SO_2)_2$, $NaN(C_2F_6SO_2)_2$, and $NaC(CF_3SO_2)_3$.

The concentration of the sodium salt may be appropriately determined according to the solubility of the electrolyte in the electrolytic solution. The concentration of the magnesium salt is generally in a range of about 0.2 M to about 5 M, for example, about 0.3 M to about 3 M. In an embodiment, the concentration of the magnesium salt may be in a range of about 0.8 M to about 1.5 M. When the concentration of the sodium salt is within this range, the sodium secondary battery may have excellent internal resistance characteristics.

The non-aqueous organic solvent used in the sodium secondary battery may be the same as those used in the magnesium secondary battery. In addition, the sodium secondary battery may further include the same additives as the magnesium secondary battery The secondary battery according to embodiments of the present disclosure has high capacity and improved lifetime characteristics, and thus may be used as a battery cell for power of small devices, or in medium-large sized battery packs or battery modules including a plurality of battery cells for power of medium-large sized devices.

The medium and large-sized devices are used as power storage tools in electric vehicles such as an electric vehicle ("EV"), a hybrid electric vehicle ("HEV"), and a plug-in hybrid electric vehicle ("PHEV") or in electric motorcycle such as an electric-bike ("E-bike") and an electric-scooter ("E-scooter").

Hereinafter, one or more embodiments of the present disclosure will be described in more detail with reference to the following examples. However, these examples are not intended to limit the scope of the present disclosure.

Comparative Example 1

5 mmol of divanadium pentoxide ($V_2O_5$) and 5 mmol of octadecylamine were added to 5 mL of ethanol, and the mixture was stirred for 2 hours. Next, 15 mL of distilled water was added thereto, and the obtained mixture was stirred again for 48 hours to obtain a hydrolyzed vanadium oxide.

A hydrothermal reaction of the resulting product was performed at a temperature of 180° C. for 7 days in an autoclave. After completion of the reaction, the reaction mixture was then filtered to obtain a solid, which was then repeatedly washed with ethanol and hexane. Then, the resultant was vacuum-dried at a temperature of 80° C. to obtain a vanadium oxide.

Comparative Example 2

$V_2O_5$ powder was used as it was.

Example 1

0.91 g of $V_2O_5$ powder and 1.35 g of octadecylamine were dissolved and mixed in 5 mL of ethanol, and 15 mL of water was added thereto to obtain a mixture. A mixture ratio of $V_2O_5$ to octadecylamine was a 1:1 mole ratio.

Next, the mixture was stirred.

10 mL of water was added to the stirred mixture, and the resulting product was loaded in a Teflon-coated stainless-steel autoclave container, followed by a reaction by using a microwave-assisted solvothermal device MARS5 (microwave output power: 800 W, frequency of 2.45 GHz) for 20 hours.

The resultant was then washed, filtered, and dried at a temperature of 90° C. to obtain a vanadium oxide ($VO_{2.035}$) including vanadium having a mixed oxidation state of oxidation numbers of +3, +4, and +5.

Example 2

A vanadium oxide ($VO_{1.955}$) including vanadium having a mixed oxidation state of oxidation numbers of +3, +4, and +5 was obtained in the same manner as in Example 1, except that the mixture ratio of $V_2O_5$ powder to octadecylamine was changed to a 1:0.75 mole ratio.

Example 3

A vanadium oxide ($VO_{2.13}$) including vanadium having a mixed oxidation state of oxidation numbers of +3, +4, and +5 was obtained in the same manner as in Example 1, except that the mixture ratio of $V_2O_5$ powder to octadecylamine was changed to a 1:0.5 mole ratio.

Comparative Manufacturing Example 1: Manufacture of Magnesium Secondary Battery

The vanadium oxide of Comparative Example 1, a carbon, and PVDF as a binder were mixed in a weight ratio of 6:2:2 to obtain a mixture, which was then mechanically stirred together with NMP to prepare a slurry.

The slurry was applied on an aluminum current collector to a thickness of about 150 μm by using an applicator, followed by drying at a temperature of 120° C. to manufacture an electrode.

A magnesium secondary battery as a beaker-type three-electrode cell was assembled using the electrode, a magnesium alloy electrode in a circular form with a diameter of 12 milllimeters (mm) as a counter electrode, and Ag/0.1N $AgNO_3$ as a reference electrode. A 0.5 M $Mg(ClO_4)_2$ solution (in acetonitrile) was used as an electrolytic solution.

Comparative Manufacturing Example 2: Manufacture of Sodium Secondary Battery

The vanadium oxide of Comparative Example 2, a carbon, and PVDF as a binder were mixed in a weight ratio of 6:2:2 to obtain a mixture, which was then mechanically stirred together with NMP to prepare a slurry.

The slurry was applied on an aluminum current collector to a thickness of about 150 μm by using an applicator, followed by drying at a temperature of 120° C. to prepare an electrode.

A sodium secondary battery as a coin cell was manufactured using the electrode, a sodium thin film as a counter electrode, and a glass fiber (Whatman, GF/B) with a thickness of 1 mm as a separator. A solution of 1 M $NaPF_6$ dissolved in a propylene carbonate (PC) solvent was used as an electrolytic solution.

Manufacturing Examples 1-3: Manufacture of Magnesium Secondary Battery

Magnesium secondary batteries were manufactured in the same manner as in Comparative Manufacturing Example 1, except that the vanadium oxides of Examples 1 to 3 were used instead of the vanadium oxide of Comparative Example 1.

Manufacturing Example 4: Manufacture of Sodium Secondary Battery

A sodium secondary battery was prepared in the same manner as in Comparative Manufacturing Example 2, except that the vanadium oxide of Example 1 was used instead of the vanadium oxide of Comparative Example 2.

Evaluation Example 1: XPS Analysis

1) Examples 1-3 and Comparative Example 1

Oxidation numbers of the vanadium oxides of Examples 1 to 3 and Comparative Example 1 were evaluated by X-ray photoelectron spectroscopy ("XPS").

The XPS analysis was carried out using an analyzer Quantum 2000 Scanning ESCA Microprobe (available from Physical Electronics, Inc.) and a monochromatic Cu Kαλ having a beam diameter of 100 nm (monochromatic Cu Kαλ=1.54 Å) as a source power.

Figure 3:
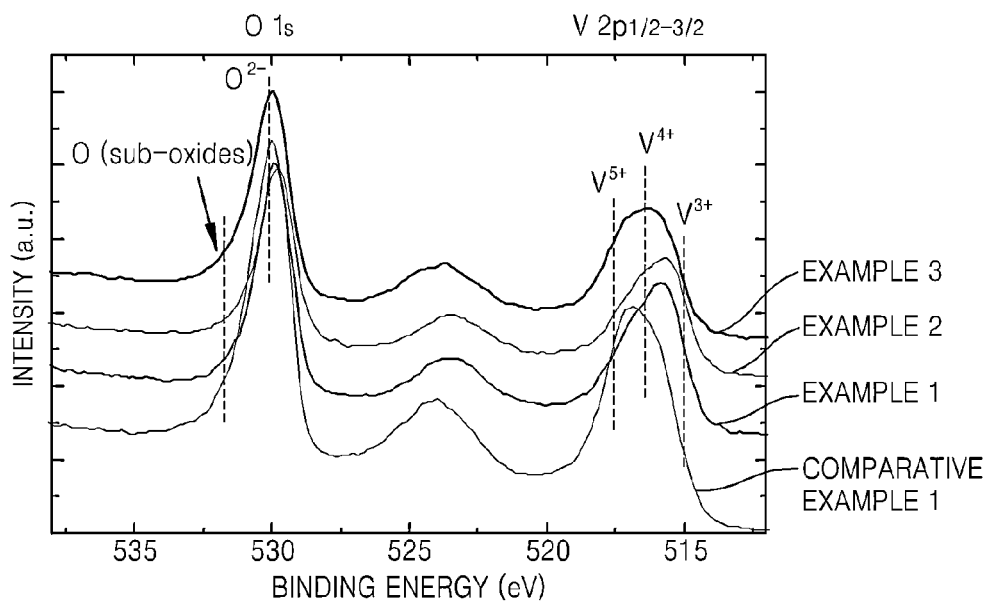
FIG. 3 is a graph of intensity (arbitrary units, a. u.) with respect to binding energy (electron volts, eV) showing the results of X-ray photoelectron spectroscopy ("XPS") analysis of vanadium oxides prepared in Examples 1 to 3 and Comparative Example 1.

The XPS results are shown in FIG. 3 and Tables 1 to 3.

The results shown in Table 2 were obtained by calculating an integral of the peaks from vanadium having an oxidation number of +3, vanadium having an oxidation number of +4, and vanadium having an oxidation number of +5 ($V^{3+}$, $V^{4+}$, and $V^{5+}$) based on the binding energies of vanadium at the 2p3 orbital. Average oxidation numbers of vanadium in each of the vanadium oxides of Comparative Example 1 and Examples 1 to 3, obtained based on the data of Table 2, are shown in Table 3. (In each of the tables, atom % and at % refer to atomic percent, based on a total content of the electrode active material.)

TABLE 1

| | Atom % | | | |
|---|---|---|---|---|
| | C1s | N1s | O1s | V2p3 |
| Comparative Example 1 | 70.01 | 3.67 | 18.44 | 7.87 |
| Example 1 | 67.98 | 3.51 | 19.53 | 8.99 |
| Example 2 | 68.09 | 3.53 | 19.31 | 9.06 |
| Example 3 | 64.40 | 2.97 | 22.67 | 9.97 |

TABLE 2

|  | $V^{5+}$ | $V^{4+}$ | $V^{3+}$ |
|---|---|---|---|
| Comparative Example 1 | 3.46(44 at %) | 4.41(56 at %) | — |
| Example 1 | 2.60(29 at %) | 4.40(49 at %) | 1.99(22 at %) |
| Example 2 | 2.53(28 at %) | 3.87(43 at %) | 2.66(29 at %) |
| Example 3 | 3.92(39 at %) | 4.72(47 at %) | 1.33(13 at %) |

TABLE 3

|  | Average oxidation number |
|---|---|
| Comparative Example 1 | 5.0 |
| Example 1 | 4.07 |
| Example 2 | 3.99 |
| Example 3 | 4.26 |

Referring to FIG. 3 and Tables 1 to 3, the vanadium oxides of Examples 1 to 3 are found to include vanadium having an oxidation state of oxidation number of 3+($V^{3+}$), unlike the vanadium oxide of Comparative Example 1. In addition, it is expected the conductivity of the vanadium oxides ($V^{3+}$) ($d^2$ orbital) of Examples 1 to 3 may be higher, due to the presence of $V^{3+}$, compared with the vanadium oxide ($V^{5+}$) ($d^0$ orbital) of Comparative Example 1.

2) Manufacturing Example 1

The magnesium secondary battery of Manufacturing Example 1 was discharged by applying a constant current of 600 mA/g thereto at a temperature of 25° C. to a cell voltage of −1.5 V (about 1.5V with respect to Mg/Mg$^{2+}$) in an open circuit voltage range of about −0.1 V to about +0.1 V with respect to a reference electrode (Ag/Ag+) (about 2.9 V to about 3.1 V with respect to Mg/Mg$^{2+}$), to measure an initial discharge capacity, followed by charging at a 0.3 C rate at a voltage of about −1.5V with respect to the reference electrode to a cut-off voltage of about 0.4 V (about 3.4V with respect to Mg/Mg$^{2+}$). The magnesium secondary battery of Manufacturing Example 1 was evaluated by XPS analysis before the charge and discharge and after the first charge and discharge cycle. The XPS analysis was carried out using an analyzer Quantum 2000 Scanning ESCA Microprobe (available from Physical Electronics, Inc.) and monochromatic Al Kα having a beam having a diameter of 100 nm (K-alpha: 1486.6 eV) as a source power.

Figure 4:
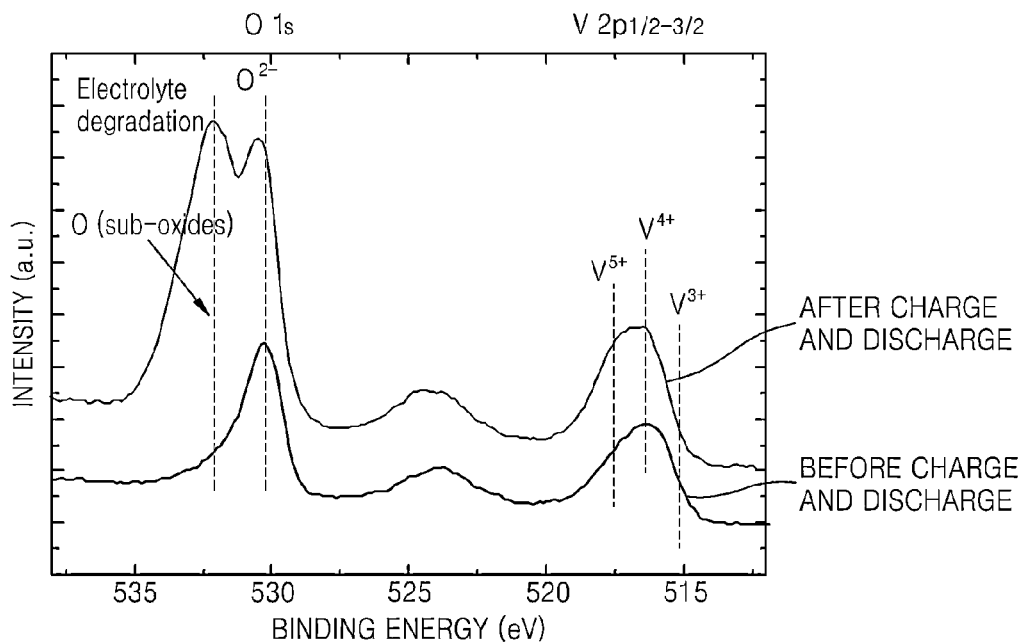
FIG. 4 is a graph of intensity (arbitrary units) with respect to binding energy (electron volts) showing the results of XPS analysis before and after charging and discharging a magnesium secondary battery of Manufacturing Example 1.

The XPS analysis results are shown in FIG. 4 and Tables 4 and 5.

The results shown in Table 2 were obtained by calculating an integral of the peaks from vanadium having an oxidation number of 3, vanadium having an oxidation number of 4, and vanadium having an oxidation number of 5 ($V^{3+}$, $V^{4+}$, and $V^{5+}$) based on the binding energies of vanadium at the 2p3 orbital.

TABLE 4

|  | Atom % | | | | | |
|---|---|---|---|---|---|---|
|  | C1s | O1s | F1s | Mg1s | Cl2p | V2p3 |
| Before charge and discharge | 79.97 | 12.44 | 2.71 | 0.14 | 0.00 | 4.74 |
| After first cycle of charge and discharge | 46.07 | 35.01 | 4.07 | 8.39 | 1.21 | 5.25 |

TABLE 5

|  | $V^{4+}$ | $V^{5+}$ | $V^{3+}$ |
|---|---|---|---|
| Before charge and discharge | 46.46 at % | 24.21 at % | 29.33 at % |
| After first cycle of charge and discharge | 47.35 at % | 35.09 at % | 17.56 at % |

Referring to Tables 4 and 5, it confirms that $V^{3+}$ is reversible after the charge and discharge.

Evaluation Example 2: Impedance Measurement

The magnesium secondary batteries of Manufacturing Examples 1 and 3 and Comparative Manufacturing Example 1 were discharged by applying a constant current of 600 mA/g thereto at a temperature of 25° C. until the cell voltage of about −1.5 V (about 1.5 V with respect to Mg/Mg$^{2+}$) in an open circuit voltage range of about −0.1 V to about +0.1 V with respect to a reference electrode (Ag/Ag+) (about 2.9 V to about 3.1 V with respect to Mg/Mg$^{2+}$) to measure an initial discharge capacity, followed by charging at a 0.3 C rate at a voltage of about −1.5 v with respect to the reference electrode to a cut-off voltage of about 0.4 V (about 3.4V with respect to Mg/Mg$^{2+}$). The magnesium secondary batteries of Manufacturing Examples 1 and 3 and Comparative Manufacturing Example 1 were evaluated by XPS analysis before the charge and discharge and after the first charge and discharge cycle.

The impedances of the magnesium secondary batteries were measured by using an impedance analyzer before the charge and discharge and after the first charge and discharge cycle, according to an alternating current impedance method.

Figure 5:
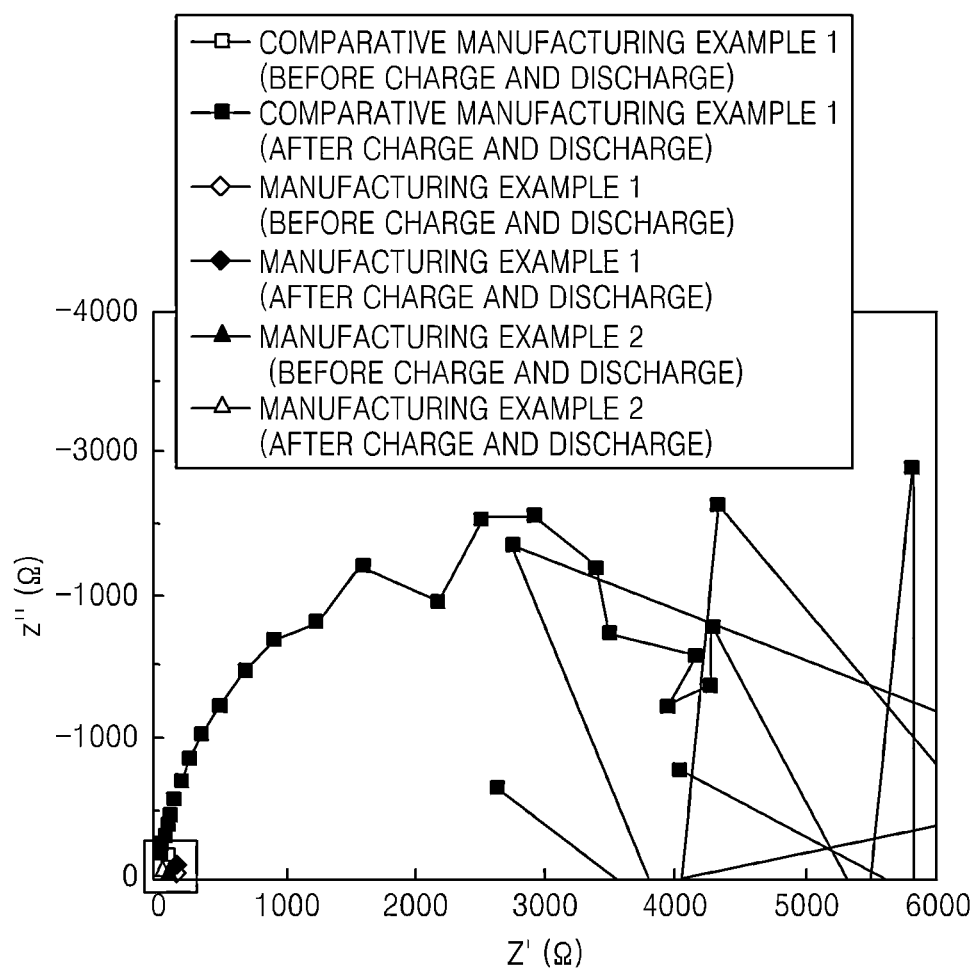
FIG. 5 is a graph reactance (Z", ohms) with respect to resistance (Z', ohms) showing the results of impedance analysis of magnesium secondary batteries of Manufacturing Examples 1 and 3 and Comparative Manufacturing Example 1.
Figure 6:
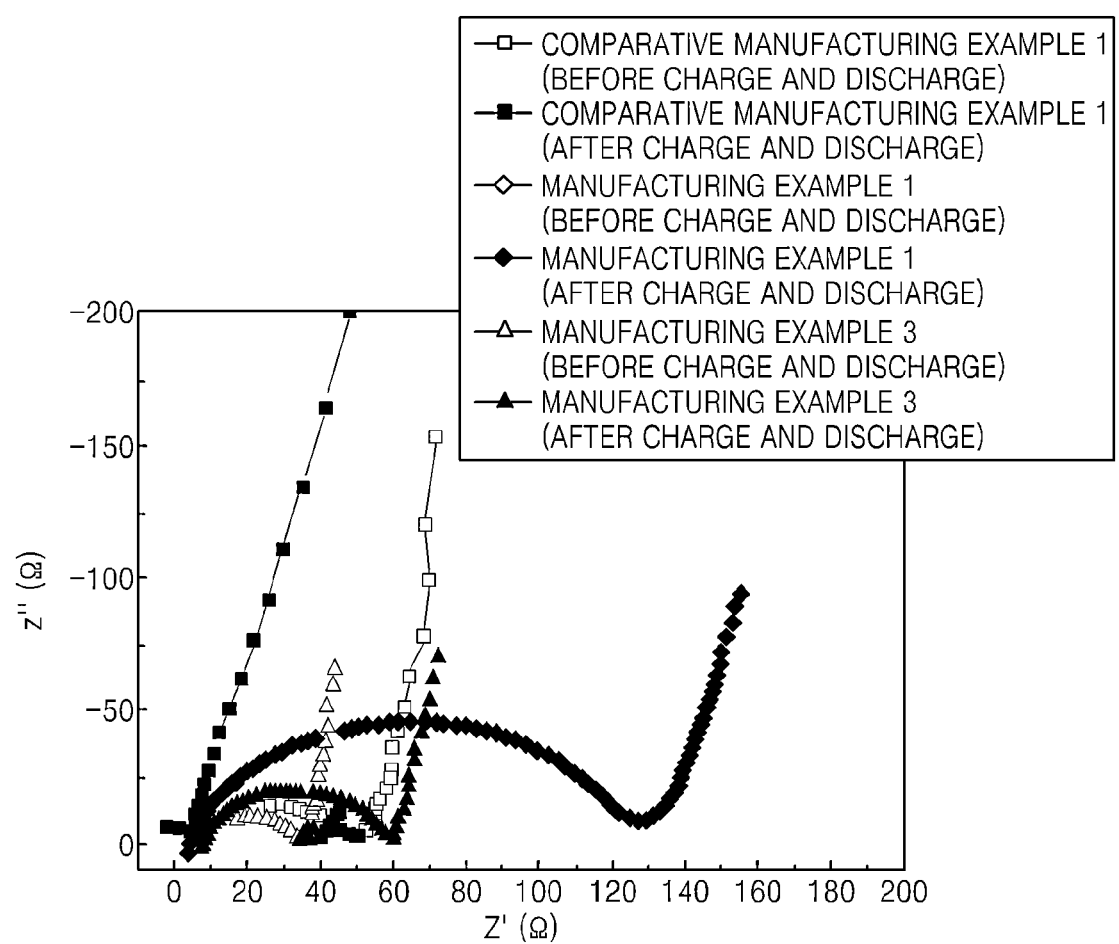
FIG. 6 is a graph reactance (Z", ohms) with respect to resistance (Z', ohms) showing an enlarged view of the portion indicated by a square in FIG. 5.

The measurement results are shown in FIG. 5. FIG. 6 is an enlarged view of a square in FIG. 5.

Referring to Table 4 and FIGS. 5 and 6, it confirms that the magnesium secondary batteries of Manufacturing Examples 1 and 3 had significantly improved impedance characteristics, compared to the magnesium secondary battery of Comparative Manufacturing Example 1.

In a magnesium battery that was manufactured according to Manufacturing Example 3 referring to FIG. 6, an increase rate of resistance (Rct) caused by charge transfer obtained when impedance of an electrode was measured after charging and discharging once with respect to a resistance (Rct) caused by charge transfer obtained when the impedance of an electrode that was before charging and discharging (unused) was measured, was 100% or less. That is, the increase in the charge transfer resistance value after one cycle of charging and discharging decreased substantially. Also, in a magnesium battery that was manufactured according to Comparative Manufacturing Example 1, a resistance (Rct) caused by charge transfer obtained when impedance of an electrode was measured after charging and discharging, was increased substantially compared with before the charging and discharging thereof.

Evaluation Example 3: Scanning Electron Microscopic (SEM) Analysis

The vanadium oxides of Examples 1 and 3 and Comparative Example 1 were analyzed by scanning electron microscopy ("SEM") using an SEM analyzer S-4700 (available from Hitachi Company.

Figure 7A:
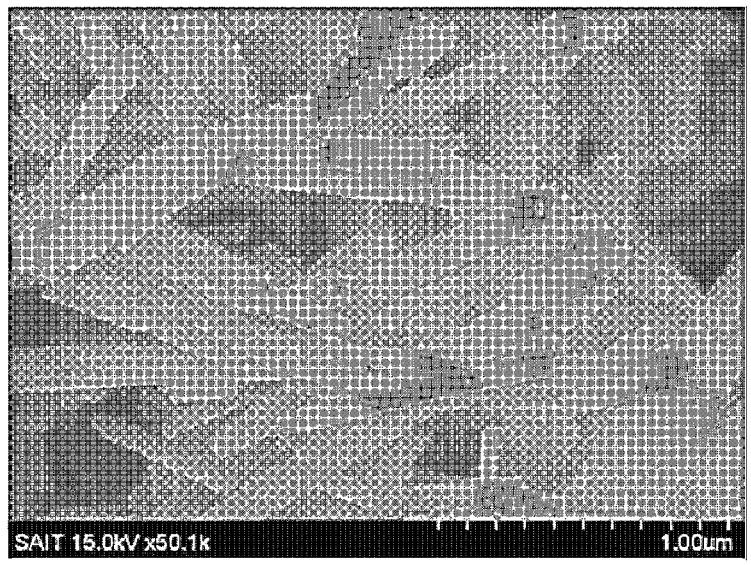
FIGS. 7A, 8A, and 9A are scanning electron microscope ("SEM") images of vanadium oxides prepared in Example 1, Example 3, and Comparative Example 1, respectively.
Figure 7B:
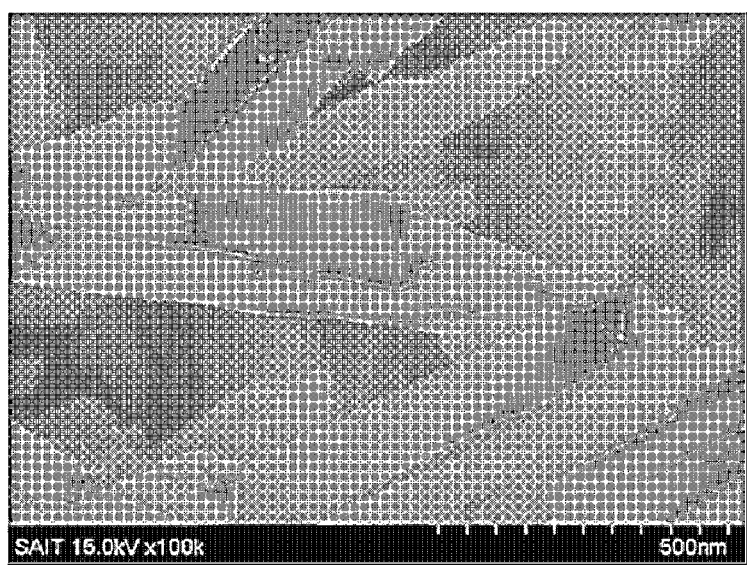
FIGS. 7B, 8B, and 9B are enlarged views of the SEM images of FIGS. 7A, 8A, and 9A, respectively.
Figure 8A:
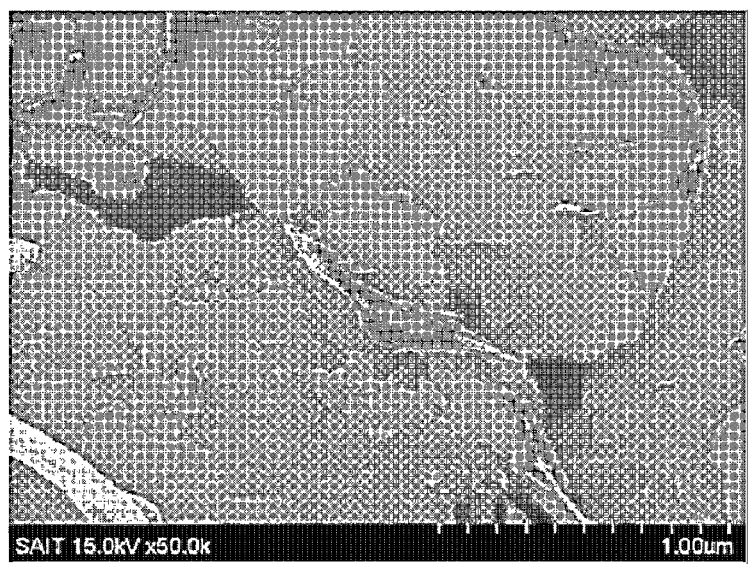
Figure 8B:
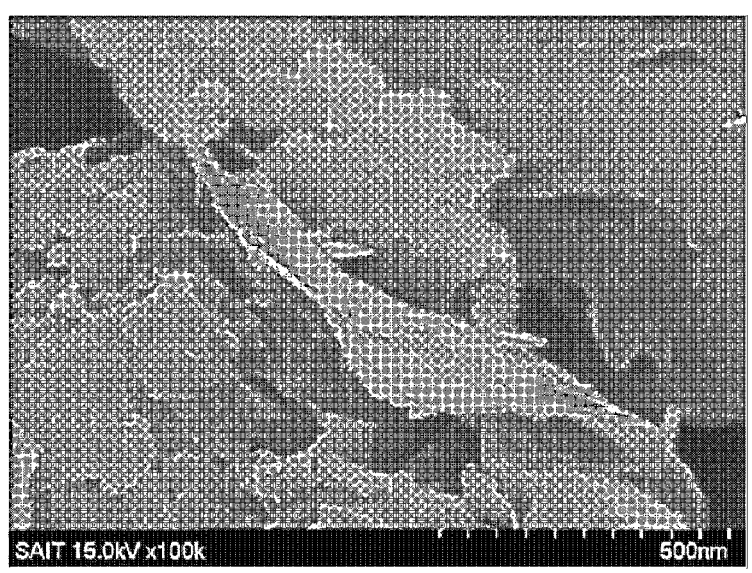
Figure 9A:
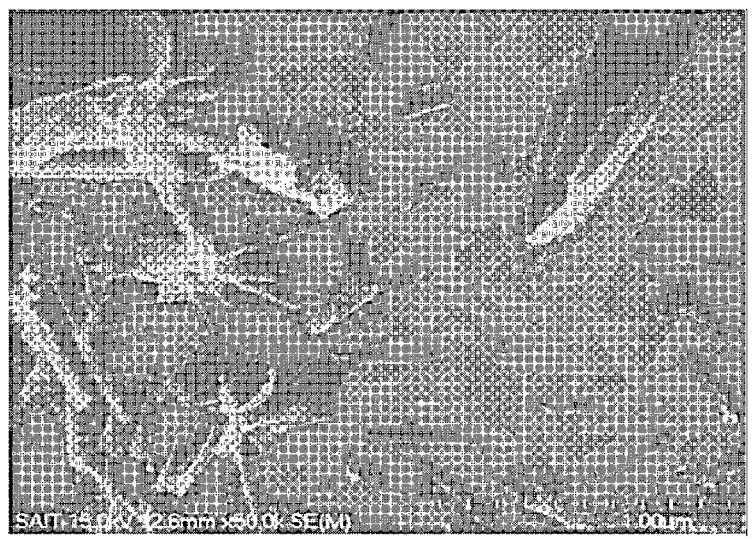
Figure 9B:
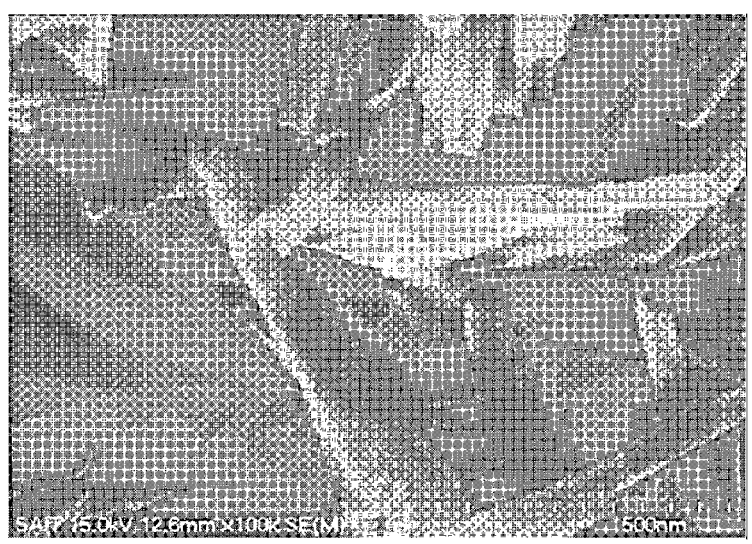

The SEM analysis results are shown in FIGS. 7A, 7B, 8A, 8B, 9A, and 9B. FIGS. 7A, 8A, and 9A are SEM images at a magnification of 50,000 of the vanadium oxides of Examples 1 and 3 and Comparative Example 1, respectively. FIGS. 7B, 8B, and 9B are SEM images at a magnification of 10,000 of the vanadium oxides of Examples 1 and 3 and Comparative Example 1, respectively.

As shown in FIGS. 7A and 7B, the vanadium oxide of Example 1 has a shape of a nanotube having opposite open ends, similar to the vanadium oxide of Comparative Example 1 (see FIGS. 9A and 9B). As shown in FIGS. 8A and 8B, the vanadium oxide of Example 3 has a shape of a nanosheet.

Evaluation Example 4: Transmission Electron Microscopic ("TEM") Analysis

The vanadium oxides of Examples 1 and 3 were analyzed by transmission electron microscopy ("TEM") using a TEM analyzer (Tecnai Titan, available from FEI).

The TEM analysis results are shown in FIGS. 10A, 10B, 11A, and 11B.

Figure 10A:
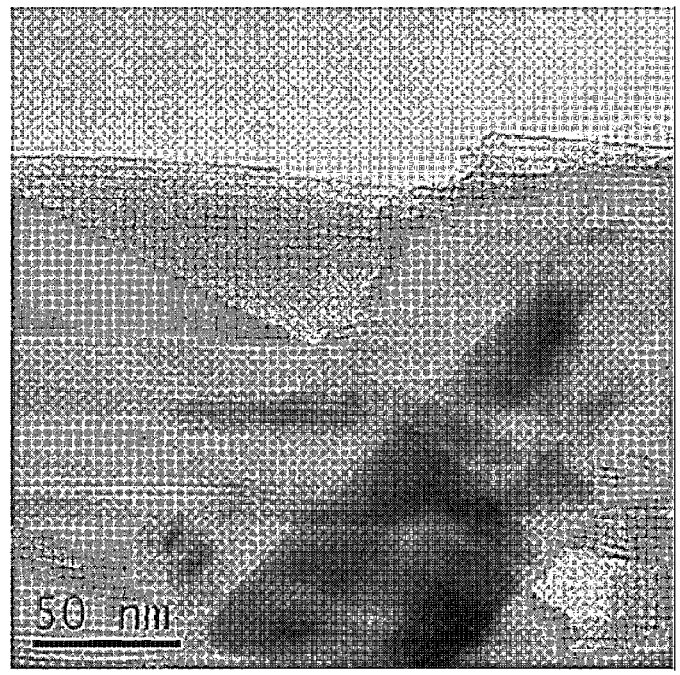
FIGS. 10A and 11A are transmission electron microscope ("TEM") images of vanadium oxides prepared in Example 1 and Example 3, respectively.
Figure 10B:
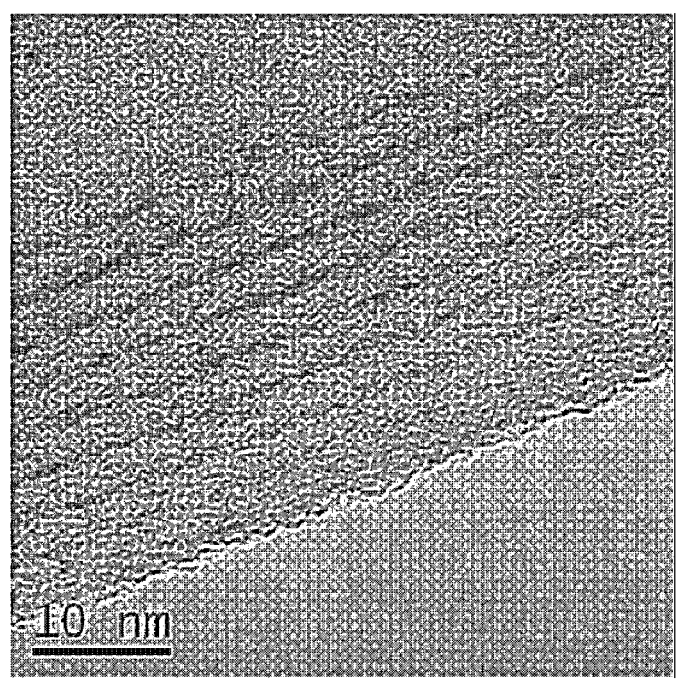
FIGS. 10B and 11B are enlarged views of the TEM images of FIGS. 10A and 11A, respectively.
Figure 11A:
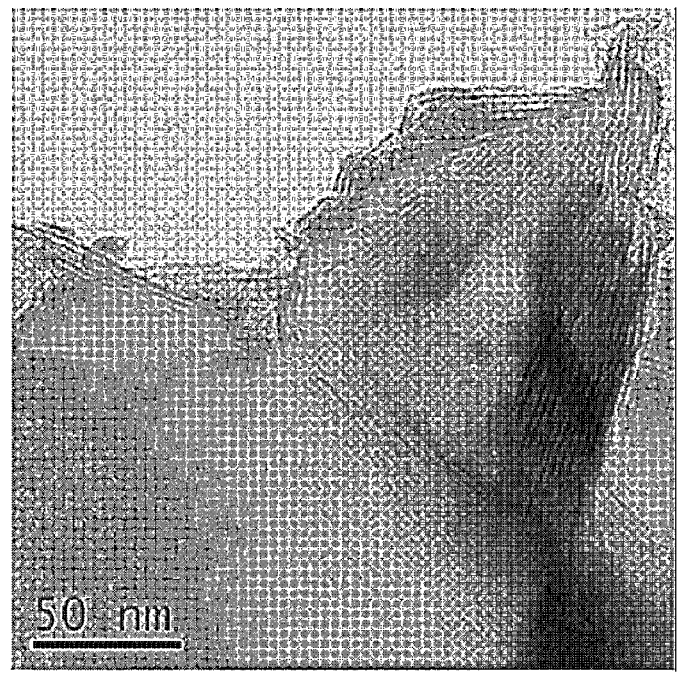
Figure 11B:
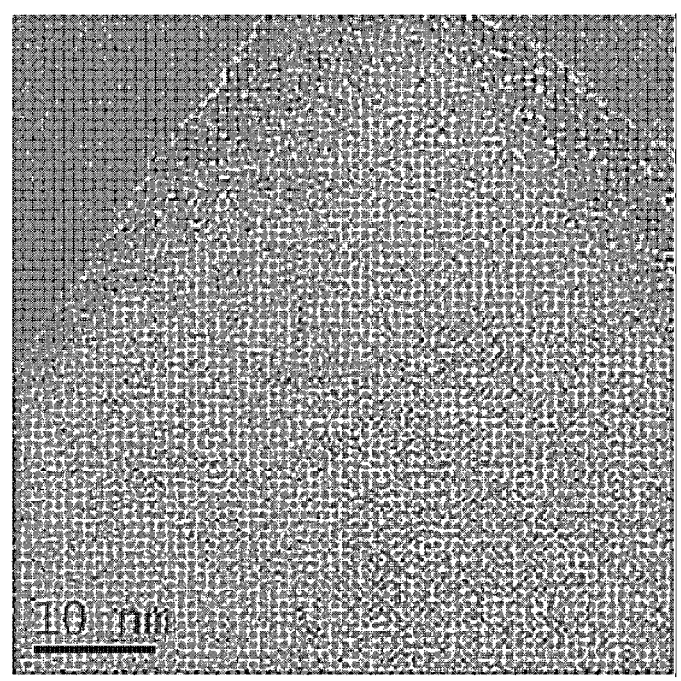

FIGS. 10B and 11B are enlarged TEM images of FIGS. 10A and 11A, respectively.

Referring to FIG. 10A, the vanadium oxide of Example 1 has a shape of a nanotube. Referring to FIG. 10B, it confirms that the vanadium oxide of Example 1 in the form of a nanotube had an interlayer distance of about 2.8 nm.

Referring to FIG. 11A, it confirms that the vanadium oxide of Example 3 had a nanosheet shape. Referring to FIG. 11B, it confirms that the vanadium oxide of Example 3 in the form of a nanosheet had one to three layers.

Evaluation Example 5: X-Ray Diffraction (XRD) Test

The vanadium oxides of Examples 1 to 3 and Comparative Example 1 were evaluated by XRD analysis using an XRD diffractometer Rigaku RINT2200HF+ that uses Cu Kα radiation (1.540598 Å) was used.

Figure 12:
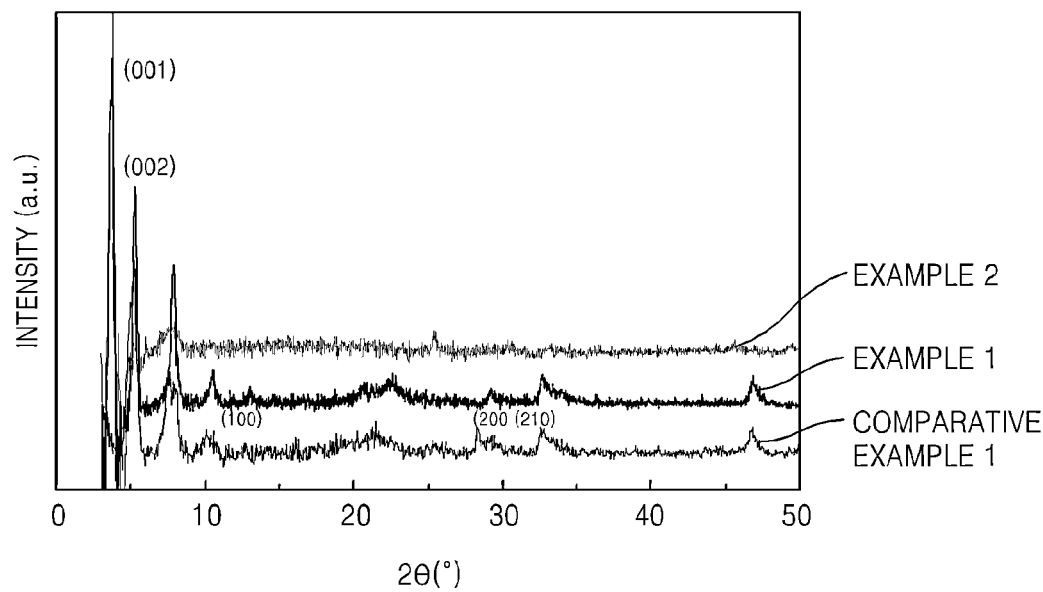
FIG. 12 is a graph of intensity (arbitrary units) with respect to diffraction angle (degrees two-theta, (2θ)) showing the results of X-ray diffraction ("XRD") analysis of vanadium oxides prepared in Example 1, Example 3, and Comparative Example 1.

The XRD analysis results are shown in FIG. 12.

In FIG. 12, a (001) crystal plane peak (hereinafter, (001) peak), a (002) crystal plane peak (hereinafter, (002) peak), and a (003) crystal plane peak (hereinafter, (003) peak) are peaks associated with a layer structure. The (001) peak appears at a Bragg 2θ angle of about 3.2±0.3°, the (002) peak appears at a Bragg angle of about 6.2±0.3° and the (003) peak appears at a Bragg angle of about 7.8±0.2° 2θ.

In comparison with the vanadium oxides of Example 1 and Comparative Example 1, no peaks with respect to the vanadium oxide of Example 3 appeared in the area where the Bragg angle is 10° 2θ or greater, indicating that the vanadium oxide of Example 3 was a vanadium oxide nanosheet with a smaller number of layers.

Based on whether the (003) peak was observed or not in the XRD graph, shape information of the vanadium oxides may be obtained. For example, the (003) peak appeared in the vanadium oxide of Example 1, but did not appear in the vanadium oxide of Example 3. Accordingly, the vanadium oxide of Example 1 may be found to have a nanotube shape and the vanadium oxide of Example 3 may be found to have a nanosheet shape.

In addition, the (001) peak and the (002) peak (hereinafter, (001) peak) appear in an area where the Bragg 2θ angle is 10° or less. The intensity ratio of the (002) peak to the (001) peak is 0.5, and the (001) peak may have a full width at half maximum ("FWHM") of 0.33. When vanadium oxides have such characteristics, it confirms that they have improved crystallinity and that they have a nanotube shape or a nanosheet shape having a layered structure along a direction of the (001) crystal plane.

Evaluation Example 6: Charge and Discharge Characteristics

The secondary batteries were evaluated on charge and discharge characteristics at a temperature of 25° C. by using a testing device TOYO-3100 (available from by TOYO. Charge characteristics were evaluated first.

In the first charge and discharge cycle, each of the batteries was discharged at a 0.3 C-rate (unit: 600 mA/g) to a cell voltage of about −1.5 V (with respect to Ag/Ag+ reference electrode) to measure a discharge capacity, followed by a 10 minutes rest. Next, each of the batteries was charged at a 0.3 C-rate to a cell voltage of about +0.4 V (with respect to Ag/Ag+ reference electrode). A current density for the charge and discharge cycle was about 600 mA/g.

1) Manufacturing Examples 1 to 3 and Comparative Manufacturing Example 1

The magnesium secondary batteries of Manufacturing Examples 1 and 3 and Comparative Manufacturing Example 1 were discharged by applying a constant current of 600 mA/g thereto at a temperature of 25° C. to a cell voltage of about −1.5 V (about 1.5V with respect to $Mg/Mg^{2+}$) in an open circuit range of about −0.1 V to about +0.1 V with respect to a reference electrode (Ag/Ag+) (about 2.9 V to about 3.1 V with respect to $Mg/Mg^{2+}$) to measure an initial discharge capacity, followed by charging at a 0.3 C rate at a voltage of about −1.5V with respect to the reference electrode to a cut-off voltage of about 0.4 V (about 3.4V with respect to $Mg/Mg^{2+}$) to measure an initial discharge capacity. The above-described charge and discharge cycle was repeated 20 times to evaluate charge and discharge characteristics.

A capacity retention rate refers to a change in discharge capacity after 15 cycles of charging and discharging from the initial discharge capacity.

Figure 13:
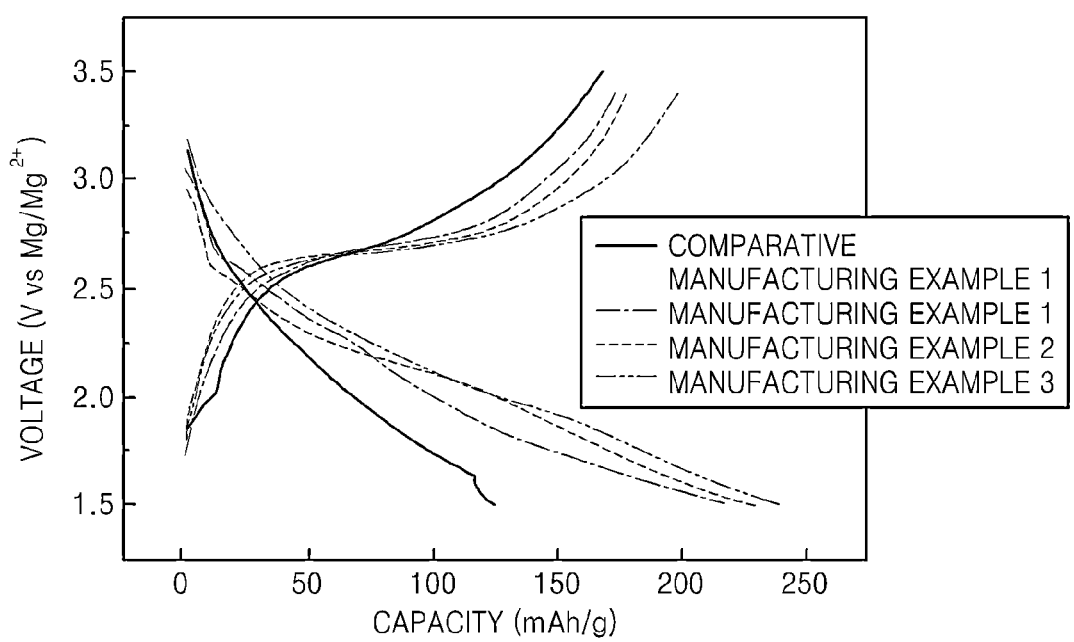
FIG. 13 is a graph of voltage (Volts versus $Mg/Mg^{2+}$) with respect to capacity (milliampere hours per gram, mAh/g) in magnesium secondary batteries of Manufacturing Example 1, Manufacturing Example 2, and Comparative Manufacturing Example 1.
Figure 14:
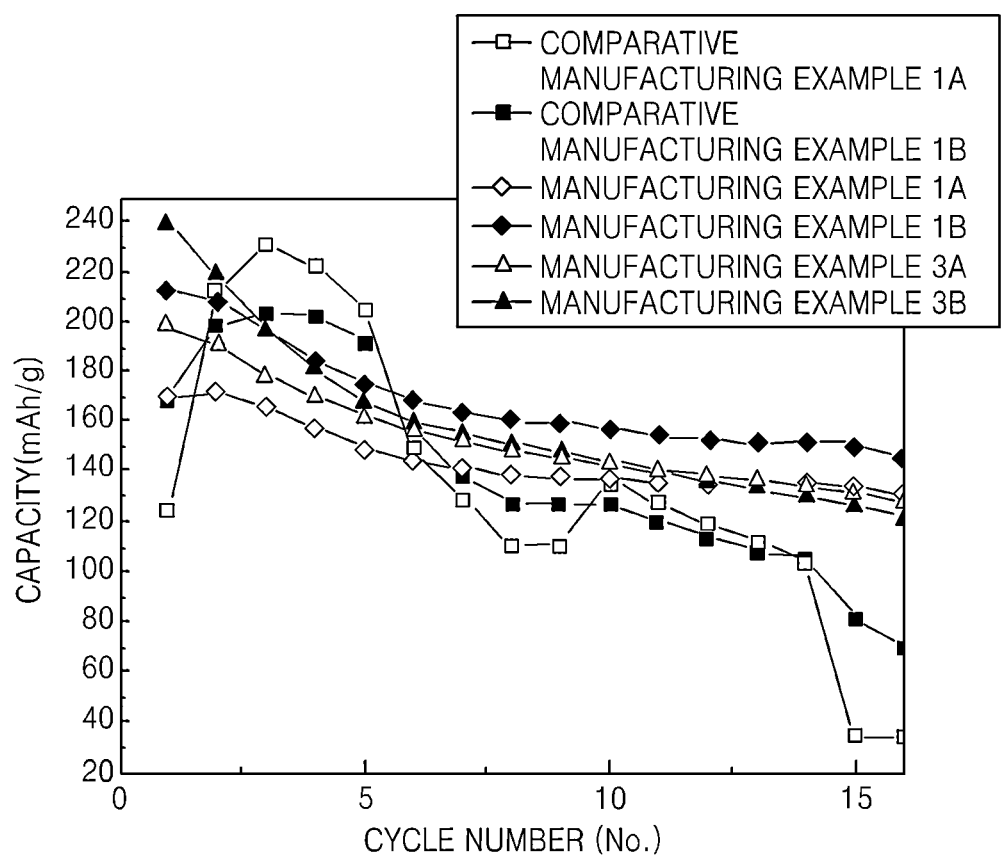
FIG. 14 is a graph of capacity (milliampere hours per gram) with respect to cycle number showing capacity retention rates of magnesium secondary batteries of Manufacturing Example 1, Manufacturing Example 2, and Comparative Manufacturing Example 1.

The charge and discharge characteristics of the batteries were evaluated and the results thereof are shown in Table 6 and FIGS. 13 and 14. In FIG. 14, A indicates discharge capacity, and B indicates charge capacity

TABLE 6

| Example | Initial discharge capacity (mAh/g) @ R.T. | Capacity retention rate (%) @ 15$^{th}$ cycle |
|---|---|---|
| Comparative Manufacturing Example 1 | 124.3(0.1 C) | 27.4 |
| Manufacturing Example 1 | 218.2(0.2 C) | 71.3 |
| Manufacturing Example 2 | 230.1(0.2 C) | 39.9 |
| Manufacturing Example 3 | 239.6(0.2 C) | 52.6 |

Referring to Table 6 and FIG. 13, it confirms that the magnesium secondary batteries of Manufacturing Examples 1 to 3 had higher initial discharge capacities compared to the magnesium secondary battery of Comparative Manufacturing Example 1. This is attributed to the reduced resistance of magnesium ions resulting from the introduction of $V^{3+}$ into the vanadium oxide.

Referring to Table 6, it confirms that the magnesium secondary batteries of Manufacturing Examples 1 to 3 had higher capacity retention rates than the magnesium secondary battery of Comparative Manufacturing Example 1.

Referring to FIG. 14, it confirms that the magnesium secondary batteries of Manufacturing Examples 1 and 3 had higher capacity retention rates than the magnesium secondary battery of Comparative Manufacturing Example 1. These results indicate that the reduced resistance of magnesium ions resulting from the introduction of $V^{3+}$ into the vanadium oxide may contribute to remaining a high initial capacity retention rate after the charge and discharge cycle, and consequently improving lifetime characteristics of the batteries.

2) Manufacturing Example 4 and Comparative Manufacturing Example 2

The sodium secondary batteries of Manufacturing Example 4 and Comparative Manufacturing Example 2 were discharged by applying a constant current of 300 mA/g thereto at a temperature of 25° C. in a voltage range of about 2.0 V to about 3.8 V (with respect to $Na/Na^+$) to measure an initial discharge capacity, followed by charging at a 0.5 C rate to a cut-off voltage of about 3.8 V to measure an initial discharge capacity. This charge and discharge cycle was repeated 15 times to evaluate charge and discharge characteristics.

A capacity retention rate refers to a change in discharge capacity after 15 cycles of charging and discharging from the initial discharge capacity.

Figure 15:
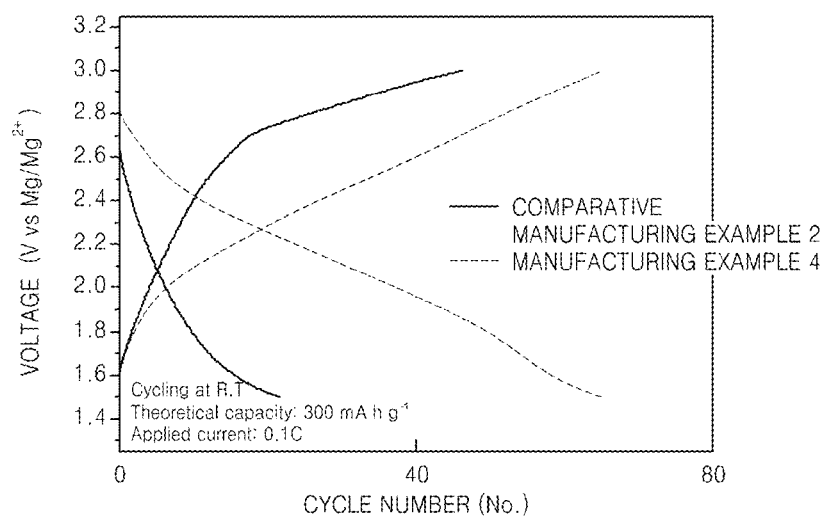
FIG. 15 is a graph of voltage (Volts versus $Mg/Mg^{2+}$) with respect to cycle number in sodium secondary batteries prepared in Manufacturing Example 4 and Comparative Manufacturing Example 2.
Figure 16:
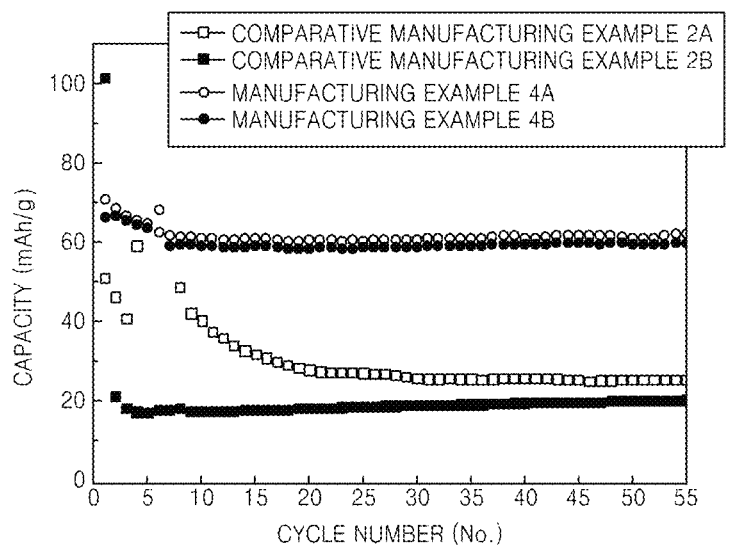
FIG. 16 is a graph of capacity (milliampere hours per gram) with respect to cycle number showing capacity retention rates of the sodium secondary batteries of Manufacturing Example 4 and Comparative Manufacturing Example 2.

The charge and discharge characteristics of the batteries were evaluated and the results thereof are shown in Table 7 and FIGS. 15 and 16. In FIG. 16, A indicates discharge capacity, and B indicates charge capacity.

TABLE 7

| Example | Initial discharge capacity (mAh/g) @ R.T. | Capacity retention rate (%) @ $15^{th}$ cycle |
|---|---|---|
| Comparative Manufacturing Example 2 | 29.9 | 19.6 |
| Manufacturing Example 4 | 66.5 | 89.4 |

Referring to Table 7 and FIG. 15, it confirms that the sodium secondary battery of Manufacturing Example 4 had higher initial discharge capacities than the sodium secondary battery of Comparative Manufacturing Example 2.

Referring to Table 7 and FIG. 16, it confirms that the sodium secondary battery of Manufacturing Example 4 had improved lifetime characteristics compared to the sodium secondary battery of Comparative Manufacturing Example 2.

As described above, according to the above embodiments of the present disclosure, an active material with a high capacity and improved lifetime characteristics may include a vanadium oxide of Formula 1 above, wherein a shape of the vanadium oxide and an oxidation state of vanadium in the vanadium oxide are appropriately controlled. A lithium battery including the active material in an electrode may have improved capacity and improved lifetime characteristics.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the present disclosure have been described with reference to the figures, it will be understood by those of ordinary skill in the art that various changes in form and details may be made therein without departing from the spirit and scope of the present disclosure as defined by the following claims.

What is claimed is:

1. An electrode active material comprising a vanadium oxide initially represented by Formula 1, $$VO_x \qquad \text{Formula 1}$$

wherein vanadium in the vanadium oxide has a mixed oxidation state of a plurality of oxidation numbers,
wherein the plurality of oxidation numbers comprise an oxidation number of +3,
wherein, in Formula 1, 1.5<x<2.5, and
wherein the vanadium having an oxidation number of +3 is contained in an amount in a range of about 10 atomic percent to about 30 atomic percent, based on a total amount of vanadium having a mixed oxidation state of oxidation numbers of +3, +4, and +5.

2. The electrode active material of claim 1, wherein the vanadium comprises a mixed oxidation state of 3 oxidation numbers.

3. The electrode active material of claim 1, wherein the plurality of oxidation numbers comprises an oxidation number of +4 and an oxidation number of +5.

4. The electrode active material of claim 3, wherein the vanadium having an oxidation number of +4 is contained in an amount in a range of about 40 atomic percent to about 60 atomic percent, based on a total amount of vanadium having a mixed oxidation state of oxidation numbers of +3, +4, and +5, and the vanadium having an oxidation number of +5 has an amount in a range of about 25 atomic percent to about 50 atomic percent, based on a total amount of vanadium having a mixed oxidation state of oxidation numbers of +3, +4, and +5.

5. The electrode active material of claim 1, wherein the vanadium oxide comprises a nanostructure.

6. The electrode active material of claim 5, wherein the vanadium oxide nanostructure is a vanadium oxide nanosheet, a vanadium oxide nanotube, or a combination thereof.

7. The active material of claim 6, wherein the vanadium oxide nanosheet is comprises a layer or a plurality of stacked layers.

8. The electrode active material of claim 6, wherein the vanadium oxide comprises a vanadium oxide nanosheet which comprises about 1 to about 10 layers and has an interlayer distance in a range of about 2.5 nanometers to about 3.5 nanometers.

9. The electrode active material of claim 6, wherein the vanadium oxide comprises a vanadium oxide nanosheet which has a shape of a circle, an ellipse, a triangle, a quadrangle, a pentagon, a hexagon, or combination thereof.

10. The electrode active material of claim 6, wherein the vanadium oxide comprises a vanadium oxide nanotube which is a multiwall nanotube.

11. The electrode active material of claim 6, wherein, the vanadium oxide comprises a vanadium oxide nanotube which has a length in a range of about 1 micrometer to about 2 micrometers, an inner diameter in a range of about 15 nanometers to about 50 nanometers, and an outer diameter in a range of about 50 nanometers to about 100 nanometers.

12. The electrode active material of claim 1, wherein in Formula 1, wherein x satisfies the condition of 1.9≤x<2.2.

13. The electrode active material of claim 1, wherein in Formula 1, x is in a range of about 1.995 to about 2.13.

14. The electrode active material of claim 1, wherein, when analyzed by X-ray diffraction analysis, a (001) peak and a (002) peak occur at a Bragg angle of 10° two-theta or less, an intensity ratio of the (002) peak to the (001) peak is 0.6 or less, and a full width at half maximum of the (001) peak is 0.5 or less.

15. An electrode comprising the electrode active material of claim 1.

16. A secondary battery comprising the electrode of claim 15.

17. The secondary battery of claim 16, wherein in the electrode active material of the electrode of the secondary battery comprising the vanadium oxide represented by Formula 1, the vanadium having an oxidation number of +3 is contained in an amount in a range of about 10 atomic percent to about 25 atomic percent, based on a total amount of vanadium having a mixed oxidation state of oxidation numbers of +3, +4, and +5, and wherein the content of the vanadium having an oxidation number of +3, +4, and +5 is determined after charging and discharging the secondary battery.

18. The secondary battery of claim 16, wherein in the electrode active material of the electrode of the secondary battery comprising the vanadium oxide represented by Formula 1, the vanadium having an oxidation number of +4 is contained in an amount in a range of about 40 atomic percent to about 60 atomic percent, based on a total amount of vanadium having a mixed oxidation state of oxidation numbers of +3, +4, and +5, wherein the vanadium having an oxidation number of +5 is contained in an amount in a range of about 30 atomic percent to about 50 atomic percent, based on the total amount of vanadium having a mixed oxidation state of oxidation numbers of +3, +4, and +5, and wherein the content of the vanadium having an oxidation number of +3, +4, and +5 is determined after charging and discharging the secondary battery.

19. A magnesium secondary battery comprising the electrode of claim 15.

20. A sodium secondary battery comprising the electrode of claim 15.

21. A lithium secondary battery comprising the electrode of claim 15.

22. A method of preparing an electrode active material comprising a vanadium oxide represented by Formula 1, $$VO_x,$$ Formula 1 wherein the vanadium in the vanadium oxide has a mixed oxidation state of a plurality of oxidation numbers, wherein the oxidation numbers comprise an oxidation number of +3, wherein, in Formula 1, 1.5<x<2.5, and wherein the vanadium having an oxidation number of +3 is contained in an amount in a range of about 10 atomic percent to about 30 atomic percent, based on a total amount of vanadium having a mixed oxidation state of oxidation numbers of +3, +4, and +5 the method comprising:

contacting a reducing agent, a solvent, and a starting material comprising vanadium oxide to obtain a mixture; and applying an electromagnetic wave to the mixture to reduce the starting material, to prepare the vanadium oxide represented by Formula 1.

23. The method of claim 22, wherein the reducing agent comprises an amine.

24. The method of claim 23, wherein the reducing agent comprises octadecylamine, butylamine, pentylamine, hexylamine, heptylamine, octylamine, nonylamine, decylamine, undecylamine, dodecylamine, tridecylamine, tetradecylamine, pentadecylamine, heptadecylamine, hexadecylamine, or combination thereof.

25. The method of claim 22, wherein the electromagnetic wave is a microwave.

26. The method of claim 25, wherein the microwave is applied to the mixture with an output in a range of about 200 watts to about 1,500 watts and a frequency in a range of about 1 gigahertz to about 2.45 gigahertz.

27. The method of claim 22, wherein the reducing of the starting material is performed by a microwave-hydrothermal reaction.

28. The method of claim 22, wherein an amount of the reducing agent is in a range of about 0.1 mole to about 1 mole, based on 1 mole of the vanadium oxide.

29. The method of claim 22, wherein the starting material containing vanadium is divanadium pentoxide, vanadium oxydiacetate, or combination thereof.

* * * * *